(12) United States Patent
Wang et al.

(10) Patent No.: US 11,533,497 B2
(45) Date of Patent: Dec. 20, 2022

(54) ENCODER, A DECODER AND CORRESPONDING METHODS OF SIGNALING AND SEMANTICS IN PARAMETER SETS

(71) Applicant: HUAWEI TECHNOLOGIES CO., LTD., Guangdong (CN)

(72) Inventors: Biao Wang, Munich (DE); Semih Esenlik, Munich (DE); Anand Meher Kotra, Munich (DE); Elena Alexandrovna Alshina, Munich (DE); Han Gao, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/681,003

(22) Filed: Feb. 25, 2022

(65) Prior Publication Data
US 2022/0182649 A1 Jun. 9, 2022

Related U.S. Application Data

(63) Continuation of application No. PCT/CN2021/078313, filed on Feb. 27, 2021.

(30) Foreign Application Priority Data

Feb. 28, 2020 (WO) ............... PCT/EP2020/055269
Jun. 9, 2020 (WO) ............... PCT/EP2020/065989
Jun. 9, 2020 (WO) ............... PCT/EP2020/065999

(51) Int. Cl.
*H04N 19/31* (2014.01)
*H04N 19/136* (2014.01)
(Continued)

(52) U.S. Cl.
CPC .......... *H04N 19/31* (2014.11); *H04N 19/136* (2014.11); *H04N 19/187* (2014.11); *H04N 19/70* (2014.11); *H04N 19/119* (2014.11); *H04N 19/176* (2014.11)

(58) Field of Classification Search
CPC ........................ H04N 19/31; H04N 19/136
See application file for complete search history.

(56) References Cited

U.S. PATENT DOCUMENTS

2016/0309159 A1  10/2016  Deshpande

FOREIGN PATENT DOCUMENTS

WO      2014049205 A1    4/2014
WO   WO 2014/049205   *   4/2014   ............ H04N 19/31
(Continued)

OTHER PUBLICATIONS

Document: JVET-Q2001-vE, Benjamin Bross et al, Versatile Video Coding (Draft 8), Joint Video Experts Team (JVET) of ITU-T SG 16 WP 3 and ISO/IEC JTC 1/SC 29/WG 11, 17th Meeting: Brussels, BE, Jan. 7-17, 2020, total 513 pages.
(Continued)

*Primary Examiner* — Jerry T Jean Baptiste
(74) *Attorney, Agent, or Firm* — Womble Bond Dickinson (US) LLP

(57) ABSTRACT

Signalling of syntax elements in a sequence parameter set of a video bitstream is addressed. Particularly, it is provided a method of decoding a video bitstream wherein a sequence parameter set, SPS, is coded that contains syntax elements that apply to a video sequence, the method comprising obtaining a value of a first syntax element from the SPS used to specify whether a decoded picture buffer, DPB, parameters syntax structure is present in the SPS and obtaining a value of a second syntax element from the SPS, at least when determining that the value of the first syntax element speci-
(Continued)

fies that the DPB parameters syntax structure is present in the SPS, used to specify the presence of a DPB syntax element in the DPB parameters syntax structure, wherein the DPB syntax element is applied to a temporal sublayer except for the highest temporal sublayer in the video sequence.

19 Claims, 18 Drawing Sheets

(51) Int. Cl.
*H04N 19/187* (2014.01)
*H04N 19/70* (2014.01)
*H04N 19/119* (2014.01)
*H04N 19/176* (2014.01)

(56) References Cited

FOREIGN PATENT DOCUMENTS

| WO | 2015061585 | A1 | 4/2015 |
|---|---|---|---|
| WO | 2016057884 | A1 | 4/2016 |

OTHER PUBLICATIONS

Document: JVET-Q2001-vC, Benjamin Bross et al, Versatile Video Coding (Draft 8), Joint Video Experts Team (JVET) of ITU-T SG 16 WP 3 and ISO/IEC JTC 1/SC 29/WG 11,17th Meeting: Brussels, BE, Jan. 7-17, 2020, total 509 pages.

Document: JVET-S0152-v5, Ye-Kui Wang et al, AHG2: Editorial input of a text integration for the May 2020 HLS AHG meeting outcome, Joint Video Experts Team (JVET) of ITU-T SG 16 WP 3 and ISO/IEC JTC 1/SC 29/WG 11, 19th Meeting: by teleconference, Jun. 22-Jul. 1, 2020, total 5 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

* cited by examiner

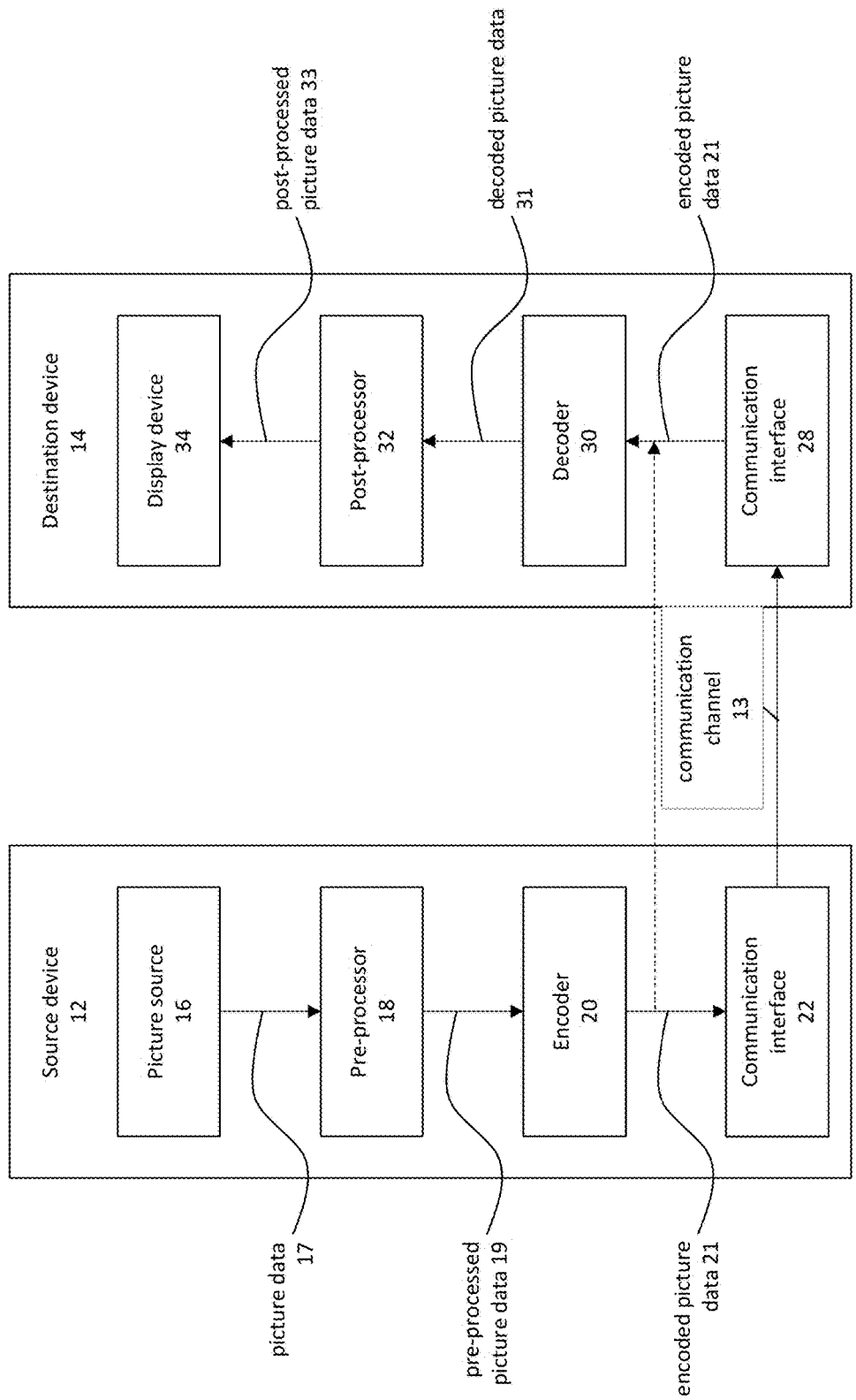

FIG. 7

ENCODER, A DECODER AND CORRESPONDING METHODS OF SIGNALING AND SEMANTICS IN PARAMETER SETS

CROSS-REFERENCE TO RELATED APPLICATIONS

This application is a continuation of International Application No. PCT/CN2021/078313, filed on Feb. 27, 2021, which claims priority to International Patent Application No. PCT/EP2020/055269, filed on Feb. 28, 2020 and International Patent Application No. PCT/EP2020/065989, filed on Jun. 9, 2020 and International Patent Application No. PCT/EP2020/065999, filed on Jun. 9, 2020. All of the aforementioned patent applications are hereby incorporated by reference in their entireties.

TECHNICAL FIELD

Embodiments of the present application generally relate to the field of picture processing and more particularly to signalling of syntax elements in a sequence parameter set.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

In particular, the signalling of syntax elements in the sequence parameter set coded in a bitstream that are used for providing Decoded Picture Buffer information suffers from inefficiencies and even inconsistencies in the art (see detailed description below). Thus, it is an object of the present application to provide techniques of signalling such syntax elements with an improved coding efficiency.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

According to a first aspect, the embodiment of the disclosure relates to a method of decoding a video bitstream implemented by a decoding device, wherein a sequence parameter set, SPS, is coded in the video bitstream and contains syntax elements that apply to a video sequence. The method comprises obtaining a value of a first syntax element (for example, a flag) from the SPS, wherein the value of the first syntax element is used to specify whether a decoded picture buffer, DPB, parameters syntax structure is present in the SPS. The method further comprises obtaining a value of a second syntax element (for example, a flag) from the SPS, at least when determining (it is determined) that the value of the first syntax element specifies that the DPB parameters syntax structure is present in the SPS, wherein the value of the second syntax element is used to specify the presence of a DPB syntax element in the DPB parameters syntax structure, wherein the DPB syntax element is applied to a temporal sublayer except for the highest temporal sublayer in the video sequence.

For example, the value of the second syntax structure may be only obtained, when it is determined that the value of the first syntax element that specifies that the DPB parameters syntax structure is present in the SPS. Here and in the following, the first syntax element may be sps_ptl_dpb_hrd_params_present_flag according to the detailed description below and the second syntax element may be sps_sublayer_dpb_params_flag according to the detailed description below. Here and in the following, the DPB syntax element may be one of max_dec_pic_buffering_minus1[i], max_num_reorder_pics[i], and max_latency_increase_plus1[i] according to the detailed description below.

The, thus, provided method of decoding a video bitstream guarantees efficient signalling of DPB syntax elements. Particularly, the second syntax element reliably controls the presence of the DPB syntax elements of the DPB parameters syntax structure when the same is present.

According to an embodiment, the method further comprises obtaining a value of the DPB syntax element based on the value of the second syntax element (for example, when the second syntax element specifies that the DPB syntax element is present in the DPB parameters syntax structure, particularly, only when the second syntax element specifies that the DPB syntax element is present in the DPB parameters syntax structure) and reconstructing the video sequence based on the value of the DPB syntax element. The reconstruction of the video sequence can thus be achieved based on a reliable and efficient signalling of the DPB information.

The operation of obtaining the value of the DPB syntax element based on the value of the second syntax element may comprise:

obtaining the value of the DPB syntax element from the DPB parameters syntax structure, when determining (it is determined) that the value of the second syntax element specifies that the DPB syntax element is present in the DPB parameters syntax structure or setting the value of the DPB syntax element equal to a value of another DPB syntax element applied to the highest temporal sublayer in the DPB parameters syntax structure, when determining (it is determined) that the value of the second syntax element specifies that the DPB syntax element is not present in the DPB parameters syntax structure.

Thereby, it can be guaranteed that a definite value of the DPB syntax element is available in any situation and can be used for reconstructing the video sequence and it is not to be worried about any indefinite behavior in this respect.

The, thus, reliably obtained value of the DPB syntax element can be used for configuring the DPB, for example, for storing reference pictures used for inter prediction processing. Accordingly, the operation of reconstructing the video sequence based on the value of the DPB syntax element may comprise configuring the DPB based on the value of the DPB syntax element and reconstructing the video sequence using the DPB.

In an embodiment, the operation of reconstructing the video sequence based on the value of the DPB syntax element may comprise reconstructing the video sequence based on determining that the DPB used satisfies the requirement specified by the value of the DPB syntax element. Thus, it can be checked whether a DPB provided is suitable for the reconstruction of the video sequence.

According to an embodiment, the method of decoding a video bitstream further comprises obtaining a value of a third syntax element from the SPS, wherein the value of the third syntax element is used to determine the maximum number of temporal sublayers that are present in the video sequence. The value of the third syntax element may be zero, if there is only one temporal sublayer. Determination of the maximum number of temporal sublayers that are present in the video sequence is facilitated by simply signalling the third syntax element which may be advantageous with respect to the coding efficiency.

Here and in the following the third syntax element may be sps_max_sublayers_minus1 according to the detailed description below.

The operation of obtaining the value of the second syntax element from the SPS may comprise determining whether the maximum number of the temporal sublayers in the video bitstream is greater than 1 based on the value of the third syntax element, when determining (it is determined) that the value of the first syntax element specifies that the DPB parameters syntax structure is present in the SPS and obtaining the value of the second syntax element from the SPS, when determining (it is determined) that the maximum number of temporal sublayers is greater than one. For example, the value of the second syntax element may be obtained from the SPS, only when it is determined that the maximum number of temporal sublayers is greater than one. Thereby, the coding efficiency may be further enhanced, since in the case that the maximum number of temporal layers is not greater than one (i.e., there is only one temporal sublayer), the value of the second syntax element may not be read at all (for example, if it becomes meaningless in this case) and for the single temporal layer DPB syntax elements may be always signaled in the SPS.

According to a second aspect, it is provided a method of encoding a video bitstream implemented by an encoding device, wherein a sequence parameter set, SPS, is encoded in the video bitstream and contains syntax elements that apply to a video sequence, which shows the same advantages as discussed above. The method comprises the operations of:

determining the presence of a decoded picture buffer, DPB, parameters syntax structure in the SPS;

encoding a value of a first syntax element (for example, a flag) into the SPS based on the determining of the presence of the DPB parameters syntax structure in the SPS, wherein the value of the first syntax element is used to specify whether the DPB parameters syntax structure is present in the SPS;

determining the presence of a DPB syntax element in the DPB parameters syntax structure, when determining (it is determined, for example, only when it is determined) that the DPB parameters syntax structure is present in the SPS, wherein the DPB syntax element is applied to a temporal sublayer except for the highest temporal sublayer in the video sequence; and encoding a value of a second syntax element (for example, a flag) into the SPS based on the determining of the presence of the DPB syntax element in the DPB parameters syntax structure, wherein the value of the second syntax element is used to specify the presence of the DPB syntax element in the DPB parameters syntax structure.

According to an embodiment, the encoding method further comprises determining a value of the DPB syntax element when determining (it is determined) that the DPB syntax element is present in the DPB parameters syntax structure; and reconstructing the video sequence based on the value of the DPB syntax element.

According to an embodiment, the encoding method further comprises setting the value of the DPB syntax element equal to a value of another DPB syntax element applied to the highest temporal sublayer in the DPB parameters syntax structure and reconstructing the video sequence based on the value of the DPB syntax element.

The operation of reconstructing the video sequence based on the value of the DPB syntax element may comprise configuring the DPB to satisfy the value of the DPB syntax element and reconstructing the video sequence using the DPB.

According to an embodiment, the presence of a DPB syntax element in the DPB parameters syntax structure is determined, when it is determined (for example, only when it is determined) that the DPB parameters syntax structure is present in the SPS and the maximum number of temporal sublayers in the video bitstream is greater than one.

Further, an apparatus for decoding and an apparatus for coding a video bitstream are provided which, respectively, show the same advantages as the above-described methods.

According to a third aspect, it is provided an apparatus for decoding a (coded) video bitstream, wherein the apparatus comprises:

an obtaining unit configured to obtain a value of a first syntax element (for example, a flag) from the SPS, wherein the value of the first syntax element is used to specify whether a decoded picture buffer, DPB, parameters syntax structure is present in a SPS coded in the video bitstream; and a determining unit configured to determine whether the value of the first syntax element specifies that the DPB parameters syntax structure is present in the SPS; and wherein the obtaining unit is further configured to obtain a value of a second syntax element (for example, a flag) from the SPS, at least when determining (it is determined, for example, only when it is determined)) that the value of the first syntax element specifies that the DPB parameters syntax structure is present in the SPS, wherein the value of the second syntax element is used to specify the presence of a DPB syntax element in the DPB parameters syntax structure, wherein the DPB syntax element is applied to a temporal sublayer except for the highest temporal sublayer in the video sequence.

For example, the value of the second syntax structure may be only obtained by the obtaining unit, when it is determined that the value of the first syntax element that specifies that the DPB parameters syntax structure is present in the SPS.

According to an embodiment, the obtaining unit is further configured for obtaining a value of the DPB syntax element based on the value of the second syntax element and reconstructing the video sequence based on the value of the DPB syntax element.

Obtaining the value of the DPB syntax element based on the value of the second syntax element may comprise:

obtaining the value of the DPB syntax element from the DPB parameters syntax structure, when determining (it is determined) that the value of the second syntax element specifies that the DPB syntax element is present in the DPB parameters syntax structure or setting the value of the DPB syntax element equal to a value of another DPB syntax element applied to the highest temporal sublayer in the DPB parameters syntax structure, when determining (it is determined) that the value of the second syntax element specifies that the DPB syntax element is not present in the DPB parameters syntax structure.

Reconstructing the video sequence based on the value of the DPB syntax element may comprise configuring the DPB based on the value of the DPB syntax element; and reconstructing the video sequence using the DPB.

Wherein DPB is used to store pictures for constructing reference picture list.

In an embodiment, reconstructing the video sequence based on the value of the DPB syntax element may comprise reconstructing the video sequence based on the determining that the DPB used satisfies the requirement specified by the value of the DPB syntax element.

According to an embodiment, the obtaining unit is further configured for obtaining a value of a third syntax element from the SPS, wherein the value of the third syntax element is used to determine the maximum number of temporal sublayers that are present in the video sequence.

Obtaining the value of the second syntax element from the SPS may comprise determining whether the maximum number of the temporal sublayers in the video bitstream is greater than 1 based on the value of the third syntax element, when determining (it is determined) that the value of the first syntax element specifies that the DPB parameters syntax structure is present in the SPS and obtaining the value of the second syntax element from the SPS, when determining (it is determined) that the maximum number of temporal sublayers is greater than one.

According to a fourth aspect, it is provided an apparatus for encoding a video bitstream, wherein the apparatus comprises:

a determining unit configured to determine the presence of a decoded picture buffer, DPB, parameters syntax structure in a SPS;

an encoding unit configured to encode a value of a first syntax element (for example, a flag) into the SPS based on the determining of the presence of the DPB parameters syntax structure in the SPS, wherein the value of the first syntax element is used to specify whether the DPB parameters syntax structure is present in the SPS; wherein the determining unit is further configured to determine the presence of a DPB syntax element in the DPB parameters syntax structure, when determining (it is determined, for example, only when it is determined) that the DPB parameters syntax structure is present in the SPS, wherein the DPB syntax element is applied to a temporal sublayer except for the highest temporal sublayer in the video sequence; and wherein the encoding unit is further configured to encode a value of a second syntax element (for example, a flag) into the SPS based on the determining of the presence of the DPB syntax element in the DPB parameters syntax structure, wherein the value of the second syntax element is used to specify the presence of the DPB syntax element in the DPB parameters syntax structure.

According to an embodiment, the determining unit is further configured for determining a value of the DPB syntax element when determining (it is determined) that the DPB syntax element is present in the DPB parameters syntax structure; and reconstructing the video sequence based on the value of the DPB syntax element.

According to an embodiment, the encoding unit is further configured for setting the value of the DPB syntax element equal to a value of another DPB syntax element applied to the highest temporal sublayer in the DPB parameters syntax structure and reconstructing the video sequence based on the value of the DPB syntax element.

Reconstructing the video sequence based on the value of the DPB syntax element may comprise configuring the DPB to satisfy the value of the DPB syntax element; and reconstructing the video sequence using the DPB.

According to an embodiment, the determining unit is configured for determining that a DPB syntax element is present in the DPB parameters syntax structure, when the determining unit determines that the DPB parameters syntax structure is present in the SPS and the maximum number of temporal sublayers in the video bitstream is greater than one.

The above-described methods can be implemented in decoding or encoding devices, respectively, Accordingly, it is provided an encoder comprising processing circuitry for carrying out the method of encoding a video bitstream according to any one of the above-described examples. Further, it is provided an encoder comprising one or more processors and a non-transitory computer-readable storage medium coupled to the processors and storing programming for execution by the processors, wherein the programming, when executed by the processors, configures the encoder to carry out the method of encoding a video bitstream according to any one of the above-described examples. Similarly, it is provided a decoder comprising processing circuitry for carrying out the method of decoding a video bitstream according to any one of the above-described examples and a decoder comprising one or more processors and a non-transitory computer-readable storage medium coupled to the processors and storing programming for execution by the processors, wherein the programming, when executed by the processors, configures the decoder to carry out the method of decoding a video bitstream according to any one of the above-described examples.

Furthermore, it is provided a computer program product comprising a program code for performing the method according to any one of the above-described examples when executed on a computer or a processor. Similarly, it is provided a non-transitory computer-readable medium carrying a program code which, when executed by a computer device, causes the computer device to perform the method of any one of the above-described examples.

Moreover, it is provided a non-transitory storage medium which includes an encoded bitstream, the bitstream being generated by dividing a current picture of a video signal or an image signal into a plurality blocks, and comprising a plurality of syntax elements, wherein the plurality of syntax elements comprises a first syntax element in a SPS, wherein the value of the first syntax element is used to specify whether a decoded picture buffer, DPB, parameters syntax structure is present in the SPS; in case that the value of the first syntax element specifies that the DPB parameters syntax structure is present in the SPS, the bitstream further comprises a second syntax element in the SPS, wherein the value of the second syntax element is used to specify the presence of a DPB syntax element in the DPB parameters syntax structure, wherein the DPB syntax element is applied to a temporal sublayer except for the highest temporal sublayer in the video sequence.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which:

FIG. 1A is a block diagram showing an example of a video coding system configured to implement embodiments of the disclosure;

FIG. 7 is an example of tiles, slices and subpictures;

Figure 1B:
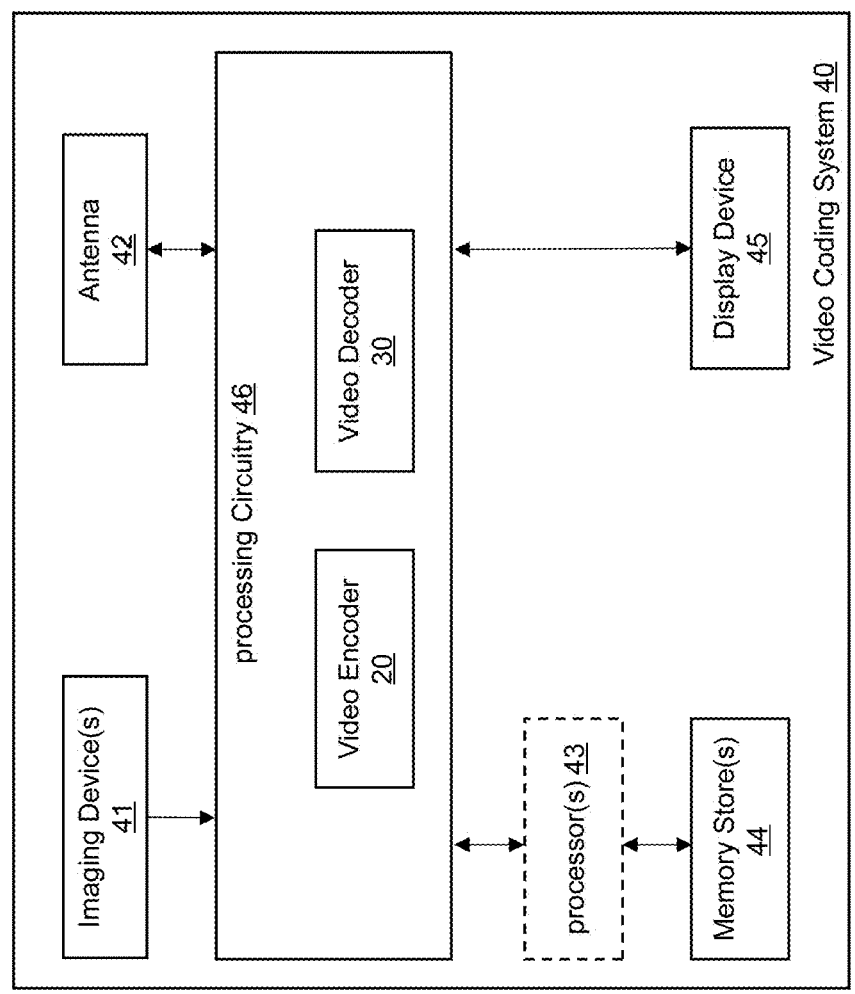
FIG. 1B is a block diagram showing another example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present embodiment of the disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
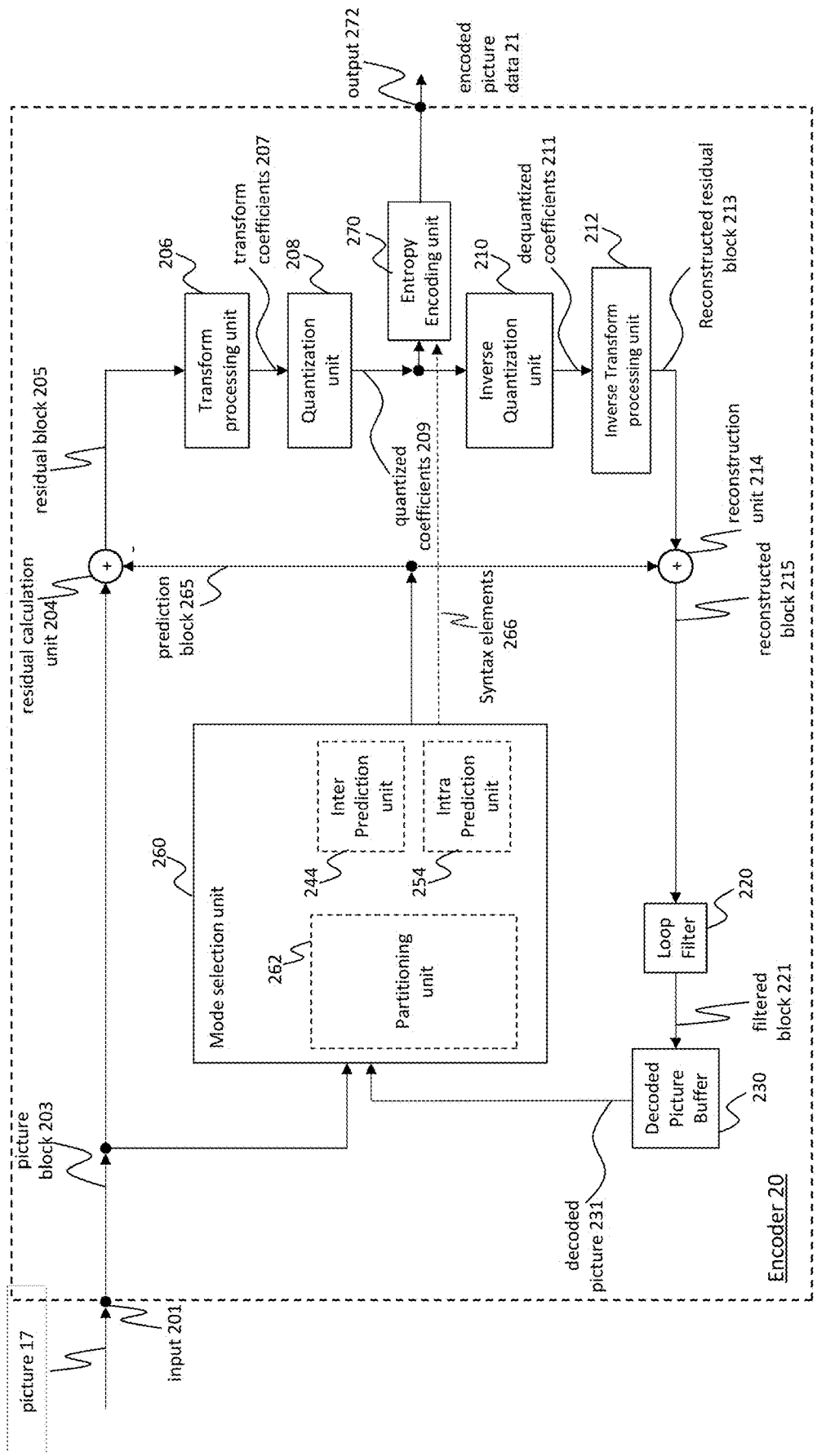
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
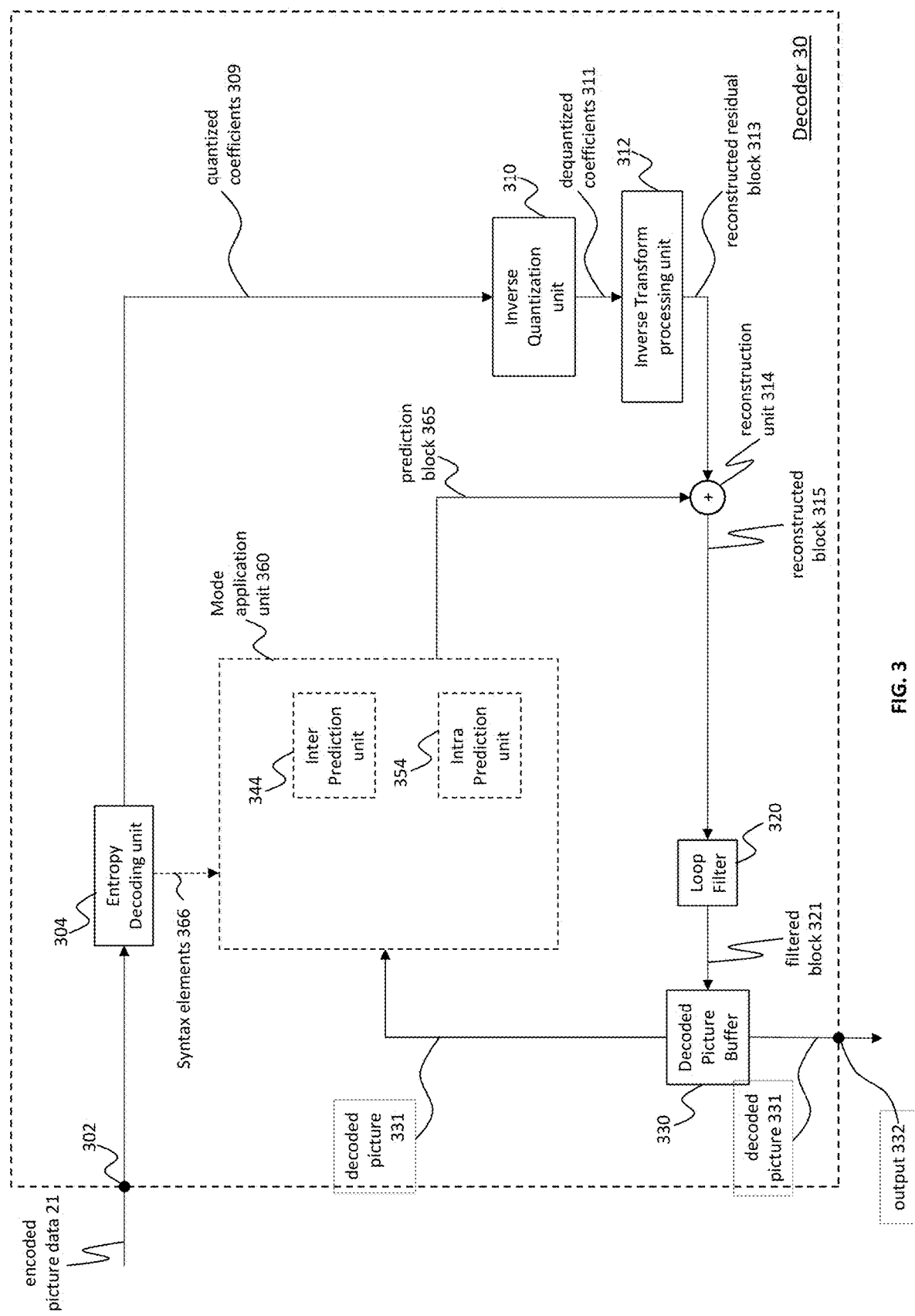
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(bitDepth-1) \sim 2^{\wedge}(bitDepth-1)-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth}) \% 2^{bitDepth} \quad (1)$$

$$mvx = (ux >= 2^{bitDepth-1}) ? (ux - 2^{bitDepth}) : ux \quad (2)$$

$$uy = (mvy + 2^{bitDepth}) \% 2^{bitDepth} \quad (3)$$

$$mvy = (uy >= 2^{bitDepth-1}) ? (uy - 2^{bitDepth}) : uy \quad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111,1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \quad (5)$$

$$mvx = (ux >= 2^{bitDepth-1}) ? (ux - 2^{bitDepth}) : ux \quad (6)$$

$$uy = (mvpy + mvdy + 2^{bitDepth}) \% 2^{bitDepth} \quad (7)$$

$$mvy = (uy >= 2^{bitDepth-1}) ? (uy - 2^{bitDepth}) : uy \quad (8)$$

The operations may be applied during the sum of mvp and mvd, as shown in formula (5) to (8).

Method 2: remove the overflow MSB by clipping the value $$vx = \text{Clip3}(-2^{bitDepth-1}, 2^{bitDepth-1}-1, vx)$$

$$vy = \text{Clip3}(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases}$$

Figure 4:
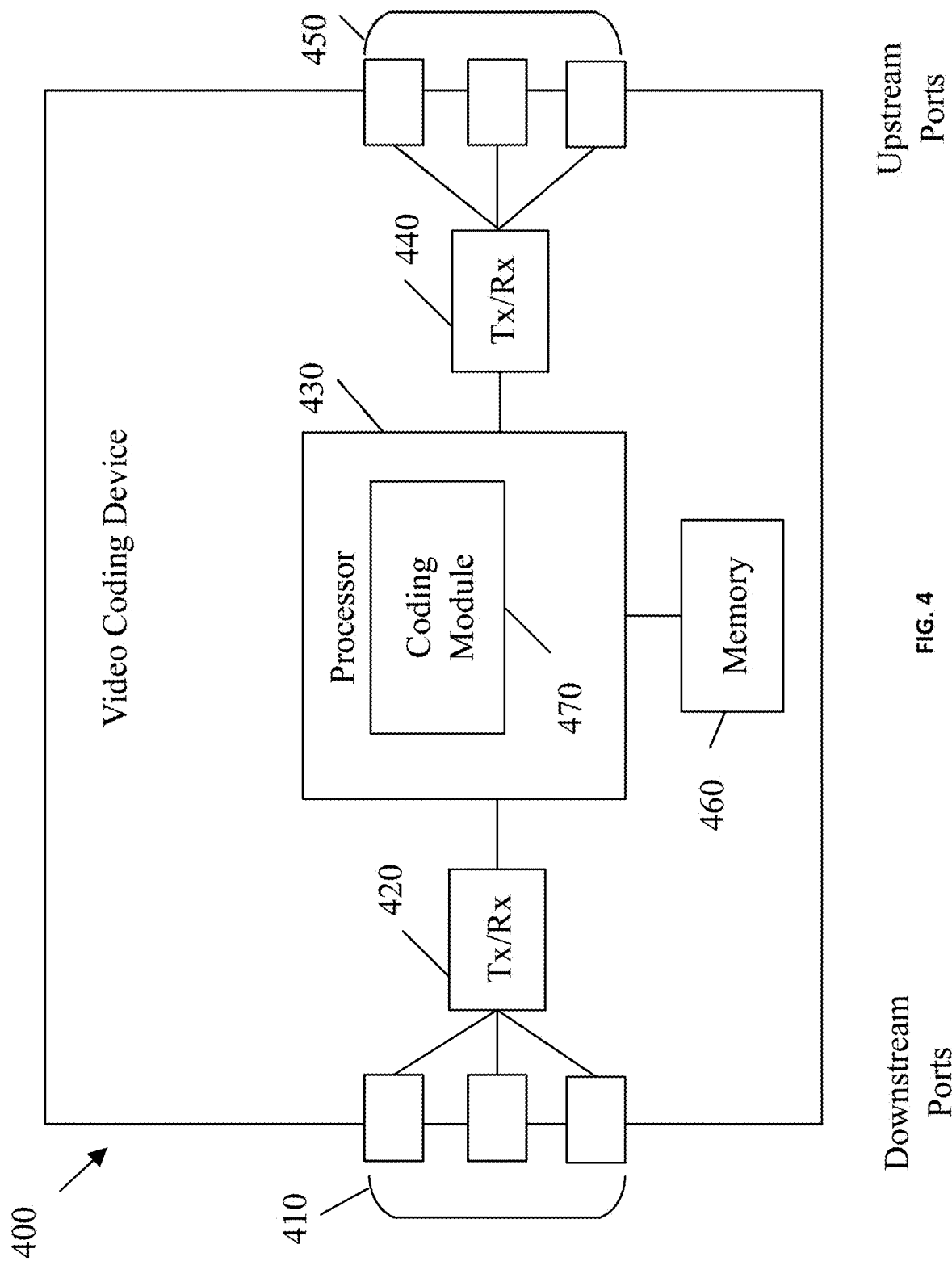
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
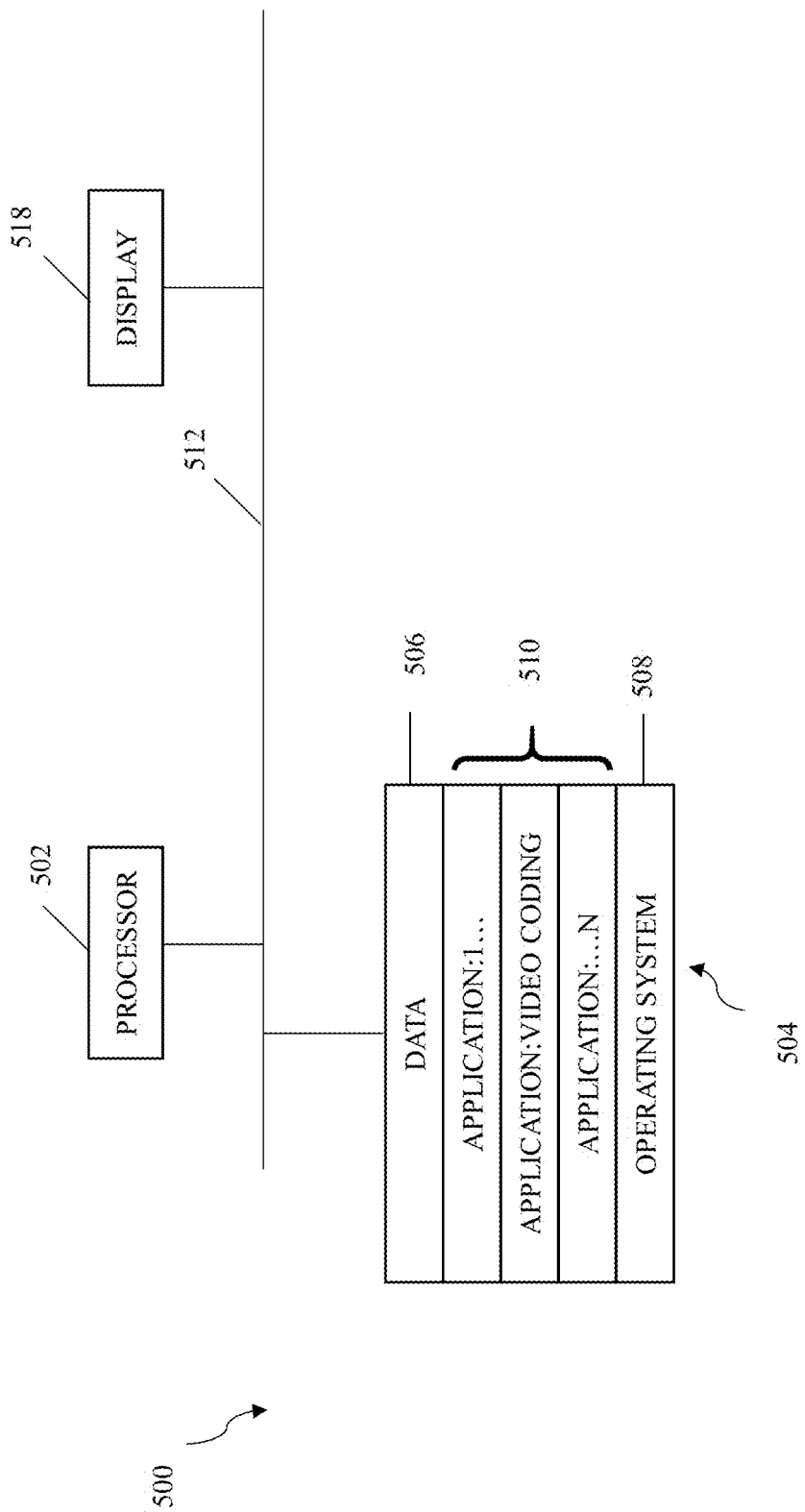
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Parameter Sets

Parameter sets are fundamentally similar and share the same basic design goals—namely bit rate efficiency, error resiliency, and providing systems layer interfaces. There is a hierarchy of parameter sets in HEVC (H.265), including the Video Parameter Set (VPS), Sequence Parameter Set (SPS) and Picture Parameter Set (PPS) which are similar to their counterparts in AVC and VVC. Each slice references a single active PPS, SPS and VPS to access information used for decoding the slice. The PPS contains information which applies to all slices in a picture, and hence all slices in a picture may require refer to the same PPS. The slices in different pictures are also allowed to refer to the same PPS. Similarly, the SPS contains information which applies to all pictures in the same coded video sequence.

While the PPS may differ for separate pictures, it is common for many or all pictures in a coded video sequence to refer to the same PPS. Reusing parameter sets is bit rate efficient because it avoids the necessity to send shared information multiple times. It is also loss robust because it allows parameter set content to be carried by some more reliable external communication link or to be repeated frequently within the bitstream to ensure that it will not get lost.

Scalable Video Coding, Layer and Video Parameter Set (VPS)

Scalable video coding provides a mechanism for coding video in multiple layers, each layer represents a quality representation of the same video scene. The base layer (BL) is the lowest quality representation. One or more enhancement layers (ELs) may be coded by referencing lower layers and provide improved video quality. Decoding a subset of layers of a scalable coded video bitstream results in video with a lower but still acceptable quality. This allows a more graceful degradation compared with non-scalable video bitstreams, where reduction in bitrate typically causes more drops in video quality.

Figure 11:
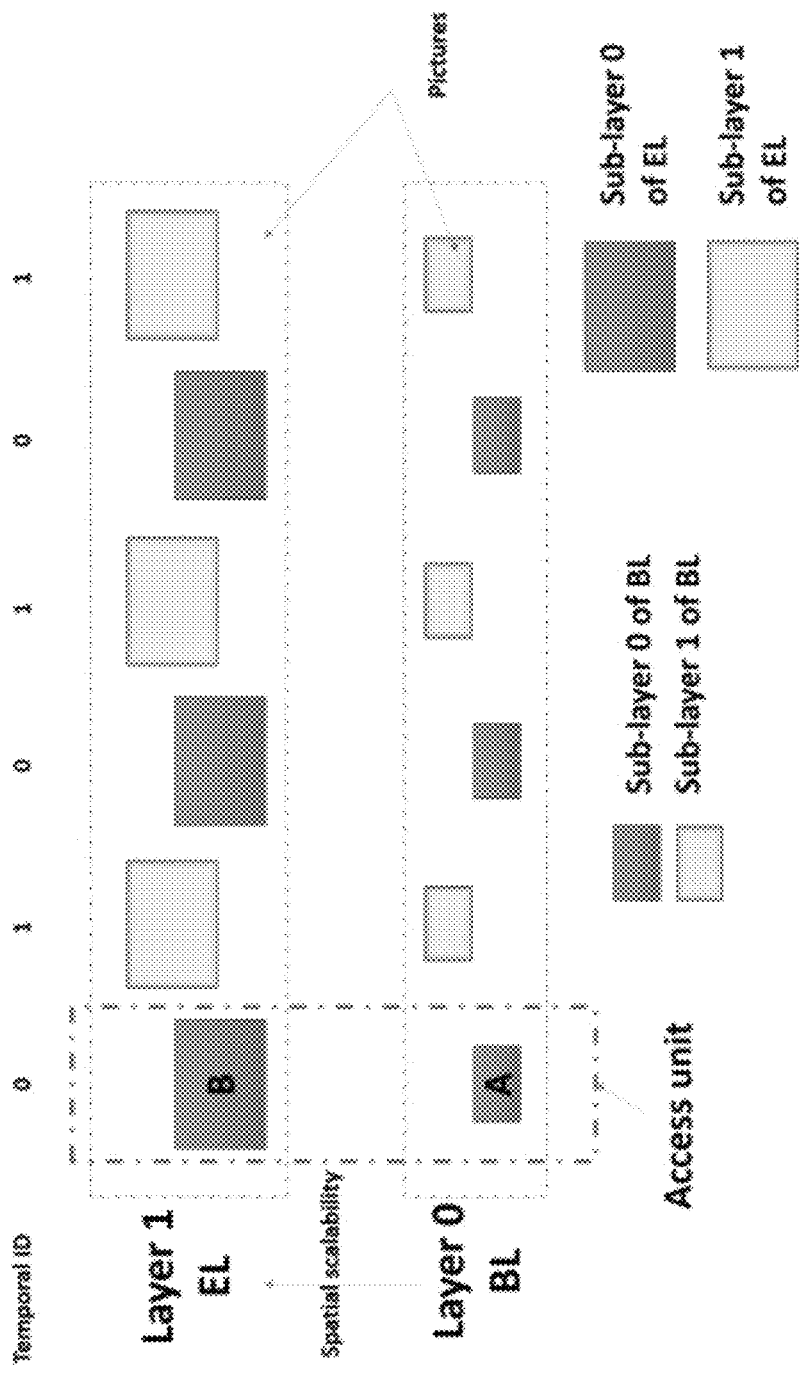
FIG. 11 shows an example about layers and sub-lays of scalable video coding.

There are multiple types of scalability exists in a scalable video sequence, including temporal scalability, spatial scalability, and quality scalability. FIG. 11 provides an example illustrating both spatial and temporal scalability. In FIG. 11, two layers are coded in different resolutions. The BL has a lower resolution while the EL has a higher resolution, and the spatial scalability is achieved by providing the decoder to decode either the BL, EL, or both.

In addition to spatial scalability, temporal scalability is achieved within a coding layer. In this example, each coding layer is divided into two temporal sub-layers, which are labeled by temporal ID 0 and IID 1, respectively. The temporal scalability is achieved by providing to decode either temporal sub-layer 0 (with temporal ID equal to 0) or both sub-layer 0 and 1.

Pictures in each layer is assigned with layer id, e.g. with syntax element nuh_layer_id. A coded layer video sequence (CLVS) is a sequence of Pictures with the same value of nuh_layer_id that comprise, in decoding order, a special coding layer video sequence starting coding picture (CLVSS, e.g. intra picture), followed by zero or more pictures that are not CLVSS pictures, including all subsequent pictures up to but not including any subsequent pictures that is a CLVSS picture.

A coded video sequence (CVS) comprises one of more coded layer video sequences (CLVS). In the example of FIG. 11, assuming the first pictures of BL and EL are CLVSS picture and all other pictures are not CLVSS pictures, this CVS comprises two CLVSs.

The Sequence Parameter Set (SPS)

The SPS contains parameters that apply to one layers of a coded video sequence and do not change from picture to picture within a coded video sequence.

In some extreme cases, an SPS might be not used by any pictures in a CLVS.

It might be also be the case that an SPS is shared by different CLVSs.

In the latest VVC specification draft (i.e. http://phenix.it-sudparis.eu/jvet/doc_end_user/documents/19_Teleconference/wg11/JVET-S0152-v5.zip, referred to as VVC draft in later section for simplicity), the definition of SPS is as follows:

sequence parameter set (SPS): A syntax structure containing syntax elements that apply to zero or more entire CLVSs as determined by the content of a syntax element found in the PPS referred to by a syntax element found in each picture header.

For definition of PPS and picture header, please refer to VVC draft.

In particular, the SPS includes information on signaling of decoded picture buffer (i.e. dpb).

Some parts of the following table shows a snapshot of part of the dpb signaling in SPS in VVC:

Signaling of Decoded Picture Buffer (DPB) Information.

Decoded Picture Buffer

Decoded Picture Buffer (DPB) is a buffer which is used to store the decoded picture for reference, for example, as a reference picture for inter prediction. In an example disclosed in VVC draft, the related syntax elements of parameters for DBP in sequence parameter set (SPS) are highlighted.

TABLE 1

Decoded picture related syntax elements in SPS

```
...
  if( sps_ptl_dpb_hrd_params_present_flag ) {
    if( sps_max_sublayers_minus1 > 0 )
      sps_sublayer_dpb_params_flag                                    u(1)
    dpb_parameters( sps_max_sublayers_minus1, sps_sublayer_dpb_params_flag )
  }
...
``` sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these four syntax structures is present in the SPS.

When sps_video_parameter_set_id is greater than 0 and there is an OLS that contains only one layer with nuh_layer_id equal to the nuh_layer_id of the SPS, or when sps_video_parameter_set_id is equal to 0, the value of sps_ptl_dpb_hrd_params_present_flag shall be equal to 1.

An OLS (output layer set) is a set of layers for which one or more layers are specified as the output layers. An output layer is a layer of an output layer set that is output.

The syntax tables for syntax structures profile_tier_level ( ), dpb_parameters( ), general_hrd_parameters( ), ols_hrd_parameters( ) can be found in VVC draft.

A syntax element sps_max_sublayers_minus1 indicates a number of available temporal sublayers. When a number of available temporal sublayers is larger than 1 (e.g. a value of syntax element sps_max_sublayers_minus1 is greater than 0), a value of the syntax element sps_sublayer_dpb_params_flag is signaled in a bitstream. The syntax element sps_sublayer_dpb_params_flag mandates whether to signal decode picture information for each available sublayer (when its value is equal to 1) or to signal just for the highest temporal sublayer (when its value is equal to 0). When a value of sps_sublayer_dpb_params_flag is not present, e.g. there is only one temporal sublayer (a value of sps_max_sublayers_minus1==0), the value of sps_max_sublayers_minus1 is inferred as 0.

In some examples, a value of syntax element sps_ptl_dpb_hrd_params_present_flag indicates whether a signaling structure dpb_parameter( ) is signaled in SPS or not. When a value of syntax element sps_ptl_dpb_hrd_params_present_flag is equal to 1, the signaled date structure dpb_parameter( ) is invoked, with the number of available temporal sublayers minus 1 (sps_max_sublayers_minus1) and the flag sps_sublayer_dpb_params_flag as the first and second parameter, respectively.

In an example, the signaling structure of dpb_parameter ( ) in VVC draft is defined as follows.

TABLE 2 definition of dpb_parameters syntax structure

| dpb_parameters( maxSubLayersMinus1, subLayerInfoFlag ) { | Descriptor |
|---|---|
|   for( i = ( subLayerInfoFlag ? 0 : maxSubLayersMinus1 );<br>    i <= maxSubLayersMinus1; i++ ) { | |
|     max_dec_pic_buffering_minus1[ i ] | ue(v) |
|     max_num_reorder_pics[ i ] | ue(v) |
|     max_latency_increase_plus1[ i ] | ue(v) |
|   } | |
| } | |

The dpb_parameters( ) syntax structure provides information of DPB size, maximum picture reorder number, and maximum latency for one or more OLSs.

When a dpb_parameters( ) syntax structure is included in a VPS, the OLSs to which the dpb_parameters( ) syntax structure applies are specified by the VPS. When a dpb_parameters( ) syntax structure is included in an SPS, it applies to the OLS that includes only the layer that is the lowest layer among the layers that refer to the SPS, and this lowest layer is an independent layer.

max_dec_pic_buffering_minus1[i] plus 1 specifies the maximum required size of the DPB in units of picture storage buffers when Htid is equal to i. The value of max_dec_pic_buffering_minus1[i] shall be in the range of 0 to MaxDpbSize−1, inclusive, where MaxDpbSize is as specified in clause A.4.2. When i is greater than 0, max_dec_pic_buffering_minus1[i] shall be greater than or equal to max_dec_pic_buffering_minus1[i−1]. When max_dec_pic_buffering_minus1[i] is not present for i in the range of 0 to maxSubLayersMinus1−1, inclusive, due to subLayerInfoFlag being equal to 0, it is inferred to be equal to max_dec_pic_buffering_minus1[maxSubLayersMinus1].

max_num_reorder_pics[i] specifies the maximum allowed number of pictures of the OLS that can precede any picture in the OLS in decoding order and follow that picture in output order when Htid is equal to i. The value of max_num_reorder_pics[i] shall be in the range of 0 to max_dec_pic_buffering_minus1[i], inclusive. When i is greater than 0, max_num_reorder_pics[i] shall be greater than or equal to max_num_reorder_pics[i−1]. When max_num_reorder_pics[i] is not present for i in the range of 0 to maxSubLayersMinus1−1, inclusive, due to subLayerInfoFlag being equal to 0, it is inferred to be equal to max_num_reorder_pics[maxSubLayersMinus1].

max_latency_increase_plus1[i] not equal to 0 is used to compute the value of MaxLatencyPictures[i], which specifies the maximum number of pictures in the OLS that can precede any picture in the OLS in output order and follow that picture in decoding order when Htid is equal to i.

When max_latency_increase_plus1[i] is not equal to 0, the value of MaxLatencyPictures[i] is specified as follows:

$$\text{MaxLatencyPictures}[i] = \text{max\_num\_reorder\_pics}[i] + \text{max\_latency\_increase\_plus1}[i] - 1 \quad (112)$$

When max_latency_increase_plus1[i] is equal to 0, no corresponding limit is expressed.

The value of max_latency_increase_plus1[i] shall be in the range of 0 to $2^{32}-2$, inclusive. When max_latency_increase_plus1[i] is not present for i in the range of 0 to maxSubLayersMinus1−1, inclusive, due to subLayerInfoFlag being equal to 0, it is inferred to be equal to max_latency_increase_plus1[maxSubLayersMinus1].

More detailed information for the syntax elements and variables used to explain the dpb parameters (max_dec_pic_buffering_minus1[i], max_num_reorder_pics[i], and max_latency_increase_plus1[i]) please refer to VVC draft.

The dpb_parameters signaling structure either signals one sublayer's decoded picture buffer information or each sublayer's decoded picture information, controlled by the value of subLayerInfoFlag. When a value of subLayerInfoFlag is 0, the decoded picture buffer information of the highest sublayer among the available temporal sublayers is signaled (i=maxSubLayersMinus1). When a value of subLayerInfoFlag is 1, the decoded picture buffer information of each sublayer among the available temporal sublayers is signaled (a value of i ranges from 0 to maxSubLayersMinus1, inclusive).

Problem About the Semantics of Syntax Element sps_sublayer_dpb_params_flag

In the VVC draft, the semantics of sps_sublayer_dpb_params_flag is defined as follows:

sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, the value of sps_sub_dpb_params_info_present_flag is inferred to be equal to 0.

The above semantics has two issues. First, there has been a typo in the last sentence.

When not present, the value of sps_sub_dpb_params_info_present_flag is inferred to be equal to 0.

sps_sub_dpb_params_info_present_flag is not defined anywhere else and the last sentence shall be modified as follows:

When not present, the value of sps_sublayer_dpb_params_flag is inferred to be equal to 0.

Second, the semantics of sps_sublayer_dpb_params_flag is not precise enough. Because the range of i in max_dec_pic_buffering_minus1[i], max_num_reorder_pics[i], and max_latency_increase_plus1[i] is not defined. It can be observed from Table 2 that when i is equal to maxSubLayersMinus1 (corresponding to sps_max_sublayers_minus1 in Table 1), no matter sps_sublayer_dpb_params_flag is equal to 0 or 1, the syntax elements max_dec_pic_buffering_minus1[i], max_num_reorder_pics[i], and max_latency_increase_plus1[i] are always signaled. sps_sublayer_dpb_params_flag doesn't control the presence of max_dec_pic_buffering_minus1 [i], max_num_reorder_pics[i], and max_latency_increase_plus1[i] in this case, which is in contradiction to the current definition.

In some examples, the syntax element sps_sublayer_dpb_params_flag is used only as the second parameter of the dpb_parameters.

For the following embodiments, we suppose the typo (the first issue) is fixed already, and the proposed embodiments focus on addressing the second issue, inaccurate semantic of sps_sublayer_dpb_params_flag.

Embodiment 1

According to the first embodiment, the semantics of sps_sublayer_dpb_params_flag is modified as follows:

sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS for i in range from 0 to sps_max_sublayers_minus1−1, inclusive, when sps_max_sublayers_minus1 is larger than 0. When sps_max_sublayers_minus1 is equal to 0, the value of sps_sublayer_dpb_params_flag is inferred to be equal to 0, and max_dec_pic_buffering_minus1[0], max_num_reorder_pics[0], and max_latency_increase_plus1[0] is always signaled for the only sublayer referred to the SPS.

In this way, the semantics of sps_sublayer_dpb_params_flag is clarified. Only when there are more than one sublayers (sps_max_sublayers_minus1 is larger than 0), it controls the presence of minus1[i], max_num_reorder_pics[i], and max_latency_increase_plus1[i] in dpb_parameters( ) syntax structure for i range from 0 to sps_max_sublayers_minus1−1. Otherwise (sps_max_sublayers_minus1 is equal to 0), the signaling of max_dec_pic_buffering_minus1[0], max_num_reorder_pics[0], and max_latency_increase_plus1[0] is always signalled, no matter which value sps_sublayer_dpb_params_flag is represented. Therefore, the semantics might also be changed as follows in Embodiment 2.

Embodiment 2 sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS for i in range from 0 to sps_max_sublayers_minus1−1, inclusive, when sps_max_sublayers_minus1 is larger than 0. When sps_max_sublayers_minus1 is equal to 0, the value of sps_sublayer_dpb_params_flag is inferred to be equal to 1, and max_dec_pic_buffering_minus1[0], max_num_reorder_pics[0], and max_latency_increase_plus1[0] is always signaled for the only sublayer referred to the SPS.

Or even remove the inference rule for the value of sps_sublayer_dpb_params_flag, as shown in Embodiment 3.

Embodiment 3 sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS for i in range from 0 to sps_max_sublayers_minus1−1, inclusive, when sps_max_sublayers_minus1 is larger than 0. When sps_max_sublayers_minus1 is equal to 0, max_dec_pic_buffering_minus1[0], max_num_reorder_pics[0], and max_latency_increase_plus1[0] is always signaled for the only sublayer referred to the SPS.

Or with some explanation when sps_max_sublayers_minus1 is equal to 0 as shown in Embodiment 4.

Embodiment 4 sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS for i in range from 0 to sps_max_sublayers_minus1−1, inclusive, when sps_max_sublayers_minus1 is larger than 0. When sps_max_sublayers_minus1 is equal to 0, the value of sps_sublayer_dpb_params_flag is meaningless, and max_dec_pic_buffering_minus1[0], max_num_reorder_pics[0], and max_latency_increase_plus1[0] is always signaled for the only sublayer referred to the SPS.

The data structure dpb_parameter ( ) is not only invoked in SPS, but also might be invoked in VPS. The following is a snapshot of VPS where dpb_parameter( ) is invoked.

TABLE 3 dpb_parameters syntax structure in VPS

```
for( i = 0; i < VpsNumDpbParams; i++ ) {
    if( !vps_default_ptl_dpb_hrd_max_tid_flag )
        vps_dpb_max_tid[ i ]                               u(3)
    dpb_parameters( vps_dpb_max_tid[ i ]
        vps_sublayer_dpb_params_present_flag )
}
```

Wherein specifying the number of dpb_parameters( ) syntax structures in the VPS.

vps_default_ptl_dpb_hrd_max_tid_flag equal to 1 specifies that the syntax elements vps_ptl_max_tid[i], vps_dpb_max_tid[i], and vps hrd_max_tid[i] are not present and are inferred to be equal to the default value vps_max_sublayers_minus1. vps_default_ptl_dpb_hrd_max_tid flag equal to 0 specifies that the syntax elements vps_ptl_max_tid[i], vps_dpb_max_tid[i], and vps_ptl_max_tid[i] are present. When not present, the value of vps_default_ptl_dpb_hrd_max_tid_flag is inferred to be equal to 1.

For detailed explanation of vps_ptl_max_tid[i] and vps_hrd_max tid[i] please refer to VVC draft.

vps_dpb_max_tid[i] specifies the TemporalId of the highest sublayer representation for which the DPB parameters may be present in the i-th dpb_parameters( ) syntax strutcure in the VPS. The value of vps_dpb_max_tid[i] shall be in the range of 0 to vps_max_sublayers_minus1, inclusive. When not present, the value of vps_dpb_max_tid[i] is inferred to be equal to vps_max_sublayers_minus1, and vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

The semantics of vps_sublayer_dpb_params_present_flag has a similar issue with the semantics of sps_sublayer_dpb_params_flag, as described before.

The size of syntax element array max_dec_pic_buffering_minus1[ ], max_num_reorder_pics[ ], and max_latency_increase_plus1[ ] is not defined in the semantics. It can be observed from Table 2 that when there is only one sublayer (corresponding to vps_dpb_max_tid[i] in Table 4 equal to 0), no matter vps_sublayer_dpb_params_present_flag is equal to 0 or 1, the syntax elements max_dec_pic_buffering_minus1[ ], max_num_reorder_pics[ ], and max_latency_increase_plus1[ ] are always signaled. vps_sublayer_dpb_params_present_flag doesn't control the presence of max_dec_pic_buffering_minus1[ ], max_num_reorder_pics[ ], and max_latency_increase_plus1[ ] in this case, which is contradict to the current definition.

Embodiment 9

In one example, the semantics of vps_sublayer_dpb_params_present_flag is modified as follows:

vps_sublayer_dpb_params_present_flag is used to control the presence of max_dec_pic_buffering_minus1[j], max_num_reorder_pics[j], and max_latency_increase_plus1[j] syntax elements in the dpb_parameters( ) syntax structure in the VPS for j in range from 0 to vps_dpb_max_tid[i]−1, inclusive, when vps_dpb_max_tid[i] in VPS is larger than 0. When not present, vps_sub_dpb_params_info_present_flag is inferred to be equal to 0.

It is noted that j instead of i is used for specifying the range of syntax element array max_dec_pic_buffering_minus1[ ], max_num_reorder_pics[ ], and max_latency_increase_plus1[ ] in order to avoid confusion of the i in vps_dpb_max_tid[i].

Remark, Problem 2 and corresponding solutions, dependentFlag etc.

When inter prediction is performed, a reference picture can be a decoded pictures from the same layer, or a reference picture from a lower layer. In the latter case, the reference picture in a low layer is called inter-layer reference picture (ILRP), and the lower layer that contains one or more ILRP is called a reference (or dependent) layer.

To support inter-layer prediction, several intermediate variables are used according to the syntax elements signaled in VPS. For example, in equation 37 of the VVC draft, a derivation process for variables dependencyFlag[i][j], NumDirectRefLayers[i], DirectRefLayerIdx[i][d], NumRefLayers[i], RefLayerIdx[i][r], and LayerUsedAsRefLayerFlag[j] is defined as follows:

The variables dependencyFlag[i][j], NumDirectRefLayers[i], DirectRefLayerIdx[i][d], NumRefLayers[i], RefLayerIdx[i][r], and LayerUsedAsRefLayerFlag[j] are derived as follows:

```
for( i = 0; i  <=  vps_max_layers_minus1; i++ ) {
    for( j = 0; j  <=  vps_max_layers_minus1; j++ ) {
        dependencyFlag[ i ][ j ] = vps_direct_ref_layer_flag[ i ][ j ]
        for( k = 0; k < i; k++ )
            if( vps_direct_ref_layer_flag[ i ][ k ]   &&   dependencyFlag[ k ][ j ] )
                dependencyFlag[ i ][ j ] = 1
    }
    LayerUsedAsRefLayerFlag[ i ] = 0
}
for( i = 0; i  <=  vps_max_layers_minus1; i++ ) {
    for( j = 0, d = 0, r = 0; j  <=  vps_max_layers_minus1; j++ ) {           (37)
        if( vps_direct_ref_layer_flag[ i ][ j ] ) {
            DirectRefLayerIdx[ i ][ d++ ] = j
            LayerUsedAsRefLayerFlag[ j ] = 1
        }
        if( dependencyFlag[ i ][ j ] )
            RefLayerIdx[ i ][ r++ ] = j
    }
    NumDirectRefLayers[ i ] = d
    NumRefLayers[ i ] = r
}
``` dependencyFlag[i][j] equal to 1 specifies that the layer with index j is a reference layer for the layer with index i. dependencyFlag[i][j] equal to 0 specifies that the layer with index j is a not reference layer for the layer with index i.

The dependency between a layer with index i and its reference layer j can be direct or indirect. If the j-th layer is a direct dependent layer of i-th layer, the dependencies is signaled with syntax element vps_direct_ref_layer_flag[i][j] for range i from 0 to, and for j from 0 to i-1 in VPS. As shown in Table 4, with syntax elements irrelevant to this embodiment of the disclosure removed:

```
for( i = 0; i <= vps_max_layers_minus1; i++ ) }                    u(6)
    ...
    if( i > 0 && !vps_all_independent_layers_flag )
    {
        vps_independent_layer_flag[ i ]                             u(1)
        if( !vps_independent_layer_flag[ i ] ) {
            ...                                                     u(1)
            for( j = 0; j < i; j++ ) {
                vps_direct_ref_layer_flag[ i ][ j ]                 u(1)
                ...
            }
        }
    }
}
```

The above syntax table shows when not all layers are independent layers, how VPS signaled the dependency between layers.

vps_max_layers_minus1 stands for is the maximum allowed number of layers in each CVS referring to the VPS. The layer dependency information is signaled only from the second lowest layer (i.e. i=1) and when not all layer are independent layer, indicated by syntax element vps_all_independent_layers_flag.

vps_all_independent_layers_flag equal to 1 specifies that all layers specified by the VPS are independently coded without using inter-layer prediction. vps_all_independent_layers_flag equal to 0 specifies that one or more of the layers specified by the VPS may use inter-layer prediction. When not present, the value of vps_all_independent_layers_flag is inferred to be equal to 1.

In VVC, the lowest layer (i.e. corresponding to vps_independent_layer_flag[0]) is always an independent layer. So the syntax element vps_independent_layer_flag[i] is signaled from the second lowest layer (i.e. vps_independent_layer_flag[1]), and its semantics is quit straight forward.

vps_independent_layer_flag[i] equal to 1 specifies that the layer with index i does not use inter-layer prediction. vps_independent_layer_flag[i] equal to 0 specifies that the layer with index i may use inter-layer prediction and the syntax elements vps_direct_ref_layer_flag[i][j] for j in the range of 0 to i-1, inclusive, are present in VPS. When not present, the value of vps_independent_layer_flag[i] is inferred to be equal to 1.

Only when a layer is not an independent layer (i.e. vps_independent_layer_flag[i] is 0), then its direct dependent layer is signaled, indicated by vps_direct_ref_layer_flag[i][j], forj ranges from 0 to i-1.

The semantics of vps_direct_ref_layer_flag[i][j] is defined as follows:

vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag[i] is equal to 0, there shall be at least one value of j in the range of 0 to i-1, inclusive, such that the value of vps_direct_ref_layer_flag [i][j] is equal to 1.

When a layer is a dependent layer (i.e. its vps_independent_layer_flag[i] is equal to 0), the constraint in the semantics of vps_direct_ref_layer_flag[i][j] specifies that at least one of its lower layers j in the range of 0 to i-1, inclusive, shall be a reference layer for layer i.

In the case of indirect dependency, it can occur when a layer i direct depends on layer k (k<i) and the layer k in turn depends on layer j (j<k). In such case, the layer with index i is dependent on layer j, and the corresponding dependencyFlag[i][j] is equal to 1.

Problem of the derivation process. Because only a layer can only depend on a lower layer, the loop of looking for dependent lower layer j in the derivation process can be simplified. It doesn't necessary for loop over all layer in VPS, but only the layers that are lower than the current layer i.

Embodiment 5

In one example, the derivation process of variables dependencyFlag[i][j], NumDirectRefLayers[i], DirectRefLayerIdx[i][d], NumRefLayers[i], RefLayerIdx[i][r], and LayerUsedAsRefLayerFlag[j] is modified as follows:

The variables dependencyFlag[i][j], NumDirectRefLayers[i], DirectRefLayerIdx[i][d], NumRefLayers[i], RefLayerIdx[i][r], and LayerUsedAsRefLayerFlag[j] are derived as follows:

```
for( i = 0; i  <=  vps_max_layers_minus1; i++ ) {
    for( j = 0; j   < i; j++ ) {
        dependencyFlag[ i ][ j ] = vps_direct_ref_layer_flag[ i ][ j ]
        for( k = 0; k < i; k++ )
            if( vps_direct_ref_layer_flag[ i ][ k ]   &&   dependencyFlag[ k ][ j ] )
                dependencyFlag[ i ][ j ] = 1
    }
    LayerUsedAsRefLayerFlag[ i ] = 0
}
for( i = 0; i  <=  vps_max_layers_minus1; i++ ) {
    for( j = 0, d = 0, r = 0; j   <i; j++ ) {
(37)
        if( vps_direct_ref_layer_flag[ i ][ j ] ) {
            DirectRefLayerIdx[ i ][ d++ ] = j
            LayerUsedAsRefLayerFlag[ j ] = 1
        }
        if( dependencyFlag[ i ][ j ] )
            RefLayerIdx[ i ][ r++ ] = j
    }
    NumDirectRefLayers[ i ] = d
    NumRefLayers[ i ] = r
}
```

Embodiment 6

In another example, the derivation process of variables dependencyFlag[i][j], NumDirectRefLayers[i], DirectRefLayerIdx[i][d], NumRefLayers[i], RefLayerIdx[i][r], and LayerUsedAsRefLayerFlag[j] is modified as follows:

The variables dependencyFlag[i][j], NumDirectRefLayers[i], DirectRefLayerIdx[i][d], NumRefLayers[i], RefLayerIdx[i][r], and LayerUsedAsRefLayerFlag[j] are derived as follows:

```
for( i = 0; i <=  vps_max_layers_minus1; i++ ) {
   for( j = 0; j  <1; j++ ) {
      dependencyFlag[ i ][ j ] = vps_direct_ref_layer_flag[ i ][ j ]
      for( k = j+1; k < i; k++ )
         if( vps_direct_ref_layer_flag[ i ][ k ]  &&   dependencyFlag[ k ][ j ] )
            dependencyFlag[ i ][ j ] = 1
   }
   LayerUsedAsRefLayerFlag[ i ] = 0
}
for( i = 0; i  <=  vps_max_layers_minus1; i++ ) {
   for( j = 0, d = 0, r = 0; j  <i; j++ ) {                                      (37)
      if( vps_direct_ref_layer_flag[ i ][ j ] ) {
         DirectRefLayerIdx[ i ][ d++ ] = j
         LayerUsedAsRefLayerFlag[ j ] = 1
      }
      if( dependencyFlag[ i ][ j ] )
         RefLayerIdx[ i ][ r++ ] = j
   }
   NumDirectRefLayers[ i ] = d
   NumRefLayers[ i ] = r
}
```

Embodiment 7

In another example, the derivation process of variables dependencyFlag[i][j], NumDirectRefLayers[i], DirectRefLayerIdx[i][d], NumRefLayers[i], RefLayerIdx[i][r], and LayerUsedAsRefLayerFlag[j] is modified as follows:

The variables dependencyFlag[i][j], NumDirectRefLayers[i], DirectRefLayerIdx[i][d], NumRefLayers[i], RefLayerIdx[i][r], and LayerUsedAsRefLayerFlag[j] are derived as follows:

```
for( i = 0; i <=  vps_max_layers_minus1; i++ ) {
   for( j = 0; j  <= vps_max_layers_minus1; j++ ) {
      dependencyFlag[ i ][ j ] = vps_direct_ref_layer_flag[ i ][ j ]
      for( k = j+1; k < i; k++ )
         if( vps_direct_ref_layer_flag[ i ][ k ]  &&   dependencyFlag[ k ][ j ] )
            dependencyFlag[ i ][ j ] = 1
   }
   LayerUsedAsRefLayerFlag[ i ] = 0
}
for( i = 0; i <=  vps_max_layers_minus1; i++ ) {
   for( j = 0, d = 0, r = 0; j  <= vps_max_layers_minus1; j++ ) {                (37)
      if( vps_direct_ref_layer_flag[ i ][ j ] ) {
         DirectRefLayerIdx[ i ][ d++ ] = j
         LayerUsedAsRefLayerFlag[ j ] = 1
      }
      if( dependencyFlag[ i ][ j ] )
         RefLayerIdx[ i ][ r++ ] = j
   }
   NumDirectRefLayers[ i ] = d
   NumRefLayers[ i ] = r
}
```

Only the loop for (k=0; k<i; k++) is modified to for (k=j+1; k<i; k++).

Embodiment 8 correspondingly, the semantics of vps_direct_ref_layer_flag[i][j] is changed as follows:

vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i in the range of 1 to vps_max_layers_minus1 and for j in the range of 0 to i−1, both inclusive, it is inferred to be equal to 0. When vps_independent_layer_flag[i] is equal to 0, there shall be at least one value of j in the range of 0 to i−1, inclusive, such that the value of vps_direct_ref_layer_flag[i][j] is equal to 1.

There are several other variables syntax elements expressing the dependency similar as vps_direct_ref_layer_flag[i][j], their range shall be changed in the same way.

In accordance with the description above a method of decoding a video bitstream and a method of encoding a video bitstream are provided herein. Correspondingly, an apparatus for decoding a (coded) video bitstream and an apparatus for decoding a video bitstream are provided herein.

Figure 14:
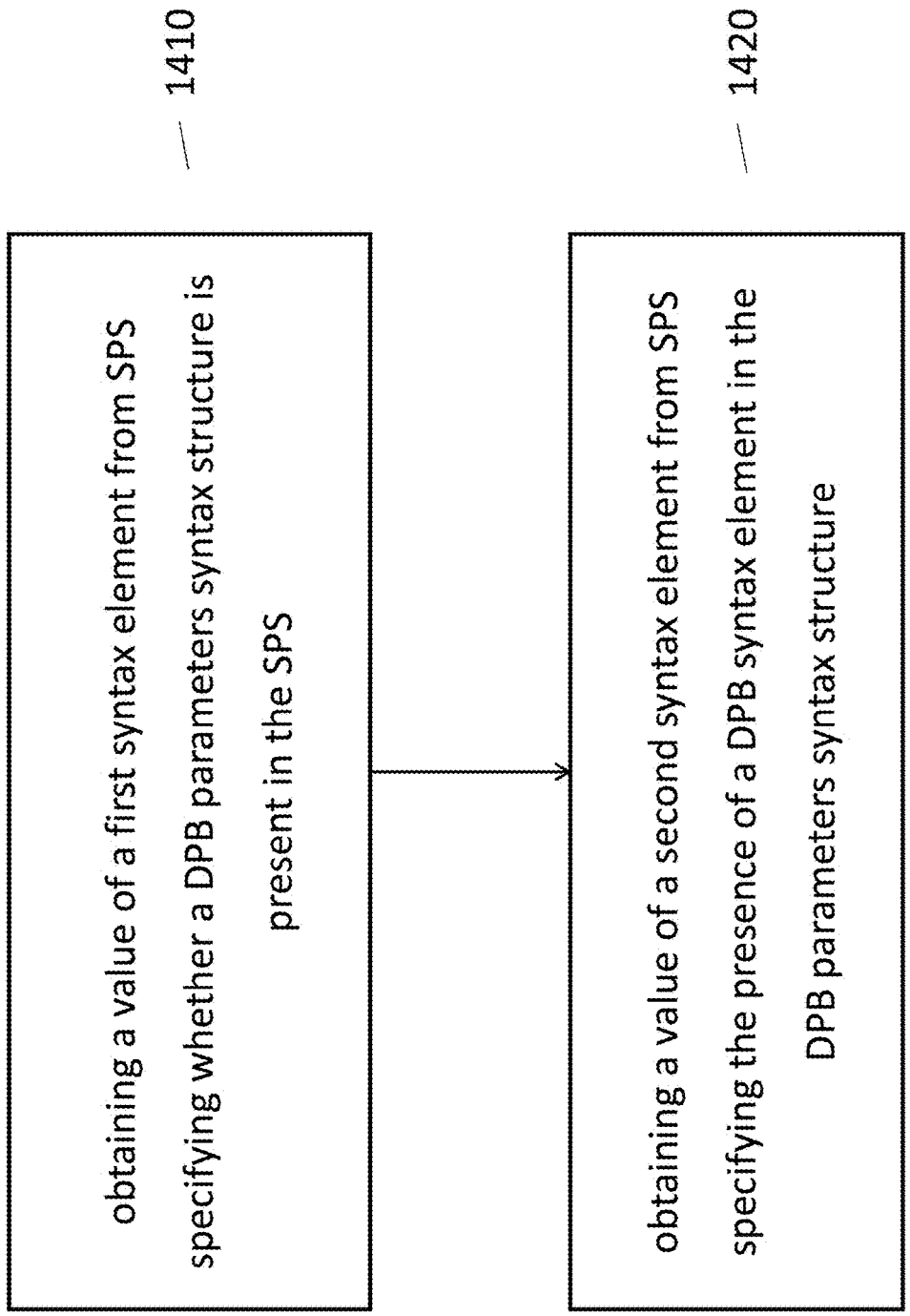
FIG. 14 illustrates a method of decoding a video bitstream according to an embodiment.

FIG. 14 illustrates a method of decoding a video bitstream implemented by a decoding device, wherein a sequence parameter set, SPS, is coded in the video bitstream and contains syntax elements that apply to a video sequence. The method comprises obtaining 1410 (for example, by parsing the bitstream) a value of a first syntax element (for example, sps_ptl_dpb_hrd_params_present_flag according to the description above) from the SPS, wherein the value of the first syntax element is used to specify whether a decoded picture buffer, DPB, parameters syntax structure is present in the SPS. The method further comprises obtaining 1420 (for example, by parsing the bitstream) a value of a second syntax element (for example, sps_sublayer_dpb_params_flag according to the description above) from the SPS, at least when determining (it is determined) that the value of the first syntax element specifies that the DPB parameters syntax structure is present in the SPS, wherein the value of the second syntax element is used to specify the presence of a DPB syntax element (for example, one of max_dec_pic_buffering_minus1[i], max_num_reorder_pics[i], and max_latency_increase_plus1[i] according to the detailed description above) in the DPB parameters syntax structure, wherein the DPB syntax element is applied to a temporal sublayer except for the highest temporal sublayer in the video sequence.

It is noted that the bitstream may be obtained by means of a wireless network or wired network. The bitstream may be transmitted from a website, server, or other remote source using a coaxial cable, fiber optic cable, twisted pair, digital subscriber line (DSL), or wireless technologies such as infrared, radio, microwave, WIFI, Bluetooth, LTE or 5G.

The bitstream may be a sequence of bits, in the form of a network abstraction layer (NAL) unit stream or a byte stream, that forms the representation of a sequence of access units (AUs) forming one or more coded video sequences (CVSs).

In a specific example, the bitstream formats specifies the relationship between a network abstraction layer (NAL) unit stream and a byte stream, either of which are referred to as the bitstream.

The bitstream can be in one of two formats: the NAL unit stream format or the byte stream format. The NAL unit stream format is conceptually the more "basic" type. The NAL unit stream format comprises a sequence of syntax structures called NAL units. This sequence is ordered in decoding order. There are constraints imposed on the decoding order (and contents) of the NAL units in the NAL unit stream.

The byte stream format can be constructed from the NAL unit stream format by ordering the NAL units in decoding order and prefixing each NAL unit with a start code prefix and zero or more zero-valued bytes to form a stream of bytes. The NAL unit stream format can be extracted from the byte stream format by searching for the location of the unique start code prefix pattern within this stream of bytes.

Figure 15:
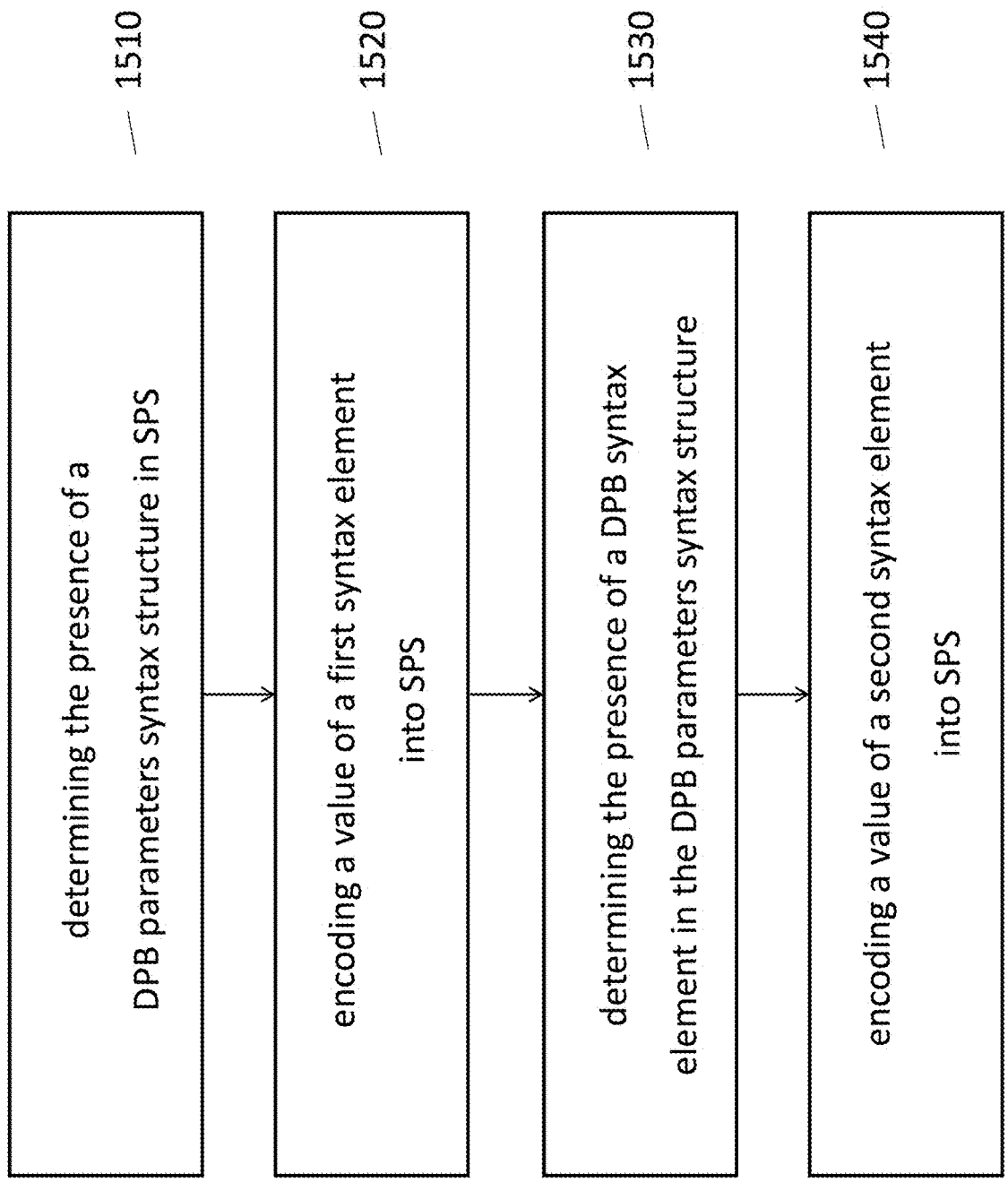
FIG. 15 illustrates a method of encoding a video bitstream according to an embodiment.

FIG. 15 illustrates a method of encoding a video bitstream implemented by an encoding device, wherein a sequence parameter set, SPS, is encoded in the video bitstream and contains syntax elements that apply to a video sequence. The method comprises determining the presence of a decoded picture buffer, DPB, parameters syntax structure in the SPS 1510. A value of a first syntax element (for example, sps_ptl_dpb_hrd_params_present_flag according to the description above) is encoded 1520 into the SPS based on the determining of the presence of the DPB parameters syntax structure in the SPS, wherein the value of the first syntax element is used to specify whether the DPB parameters syntax structure is present in the SPS. Further, the method illustrated in FIG. 15 comprises determining 1530 the presence of a DPB syntax element (for example, one of max_dec_pic_buffering_minus1[i], max_num_reorder_pics [i], and max_latency_increase_plus1[i] according to the detailed description above) in the DPB parameters syntax structure, when determining (it is determined, for example, only when it is determined)) that the DPB parameters syntax structure is present in the SPS in operation 1510, wherein the DPB syntax element is applied to a temporal sublayer except for the highest temporal sublayer in the video sequence. A value of a second syntax element (for example, sps_sublayer_dpb_params_flag according to the description above) is encoded 1540 into the SPS based on the determining of the presence of the DPB syntax element in the DPB parameters syntax structure, wherein the value of the second syntax element is used to specify the presence of the DPB syntax element in the DPB parameters syntax structure.

The above-described methods may be implanted in a video decoding apparatus or video encoding apparatus (producing a bitstream), respectively, as described in the following.

Figure 16:
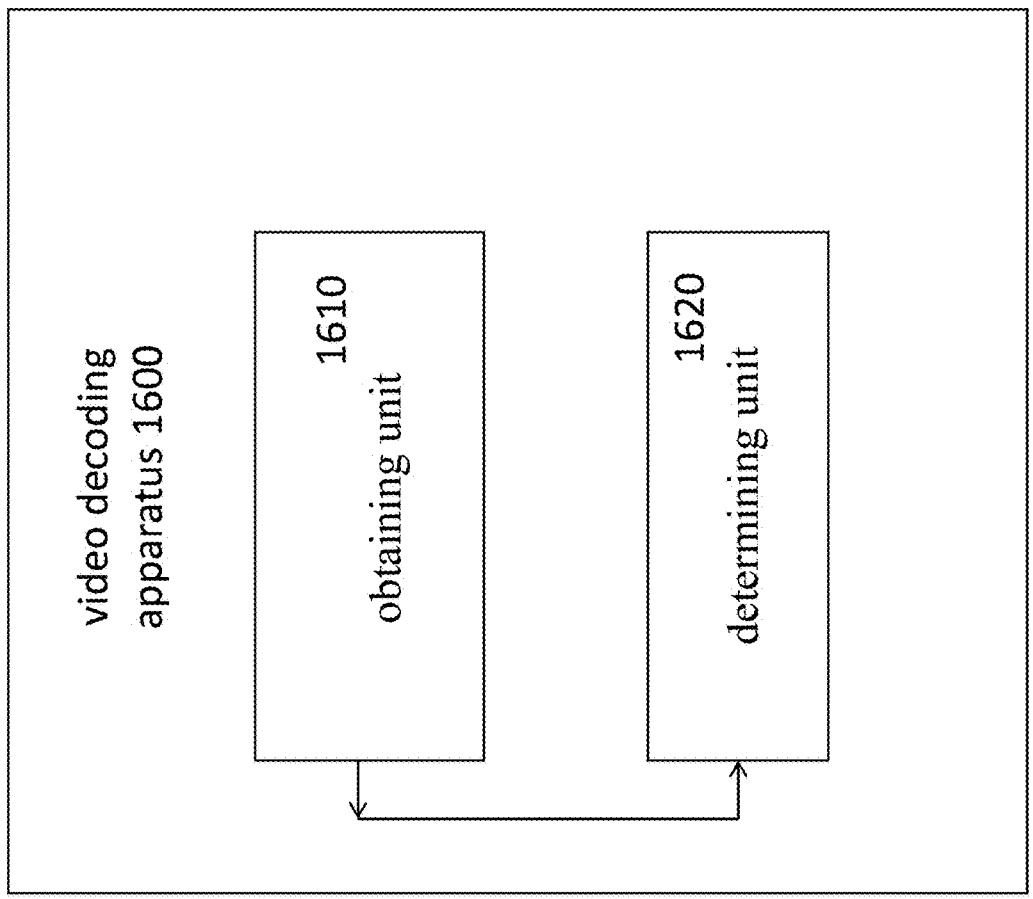
FIG. 16 illustrates a method of decoding a video bitstream according to an embodiment.
Figure 17:
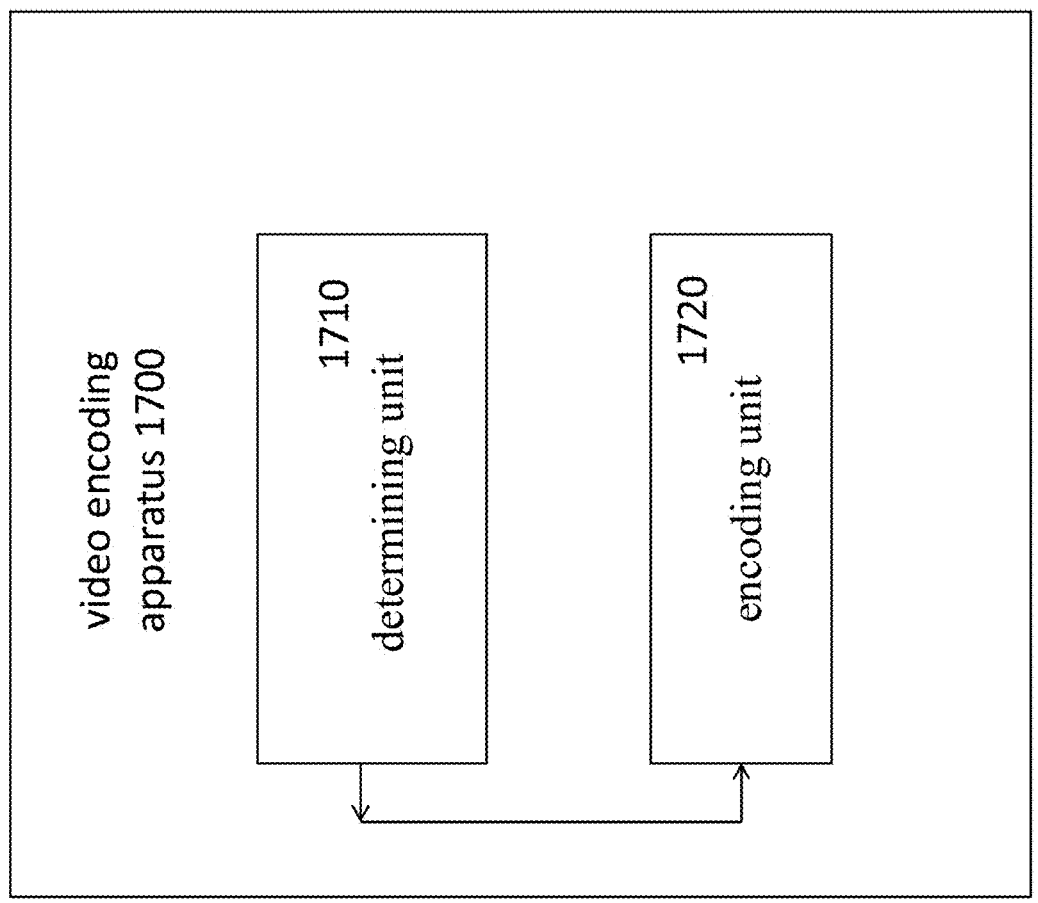
FIG. 17 illustrates a method of encoding a video bitstream according to an embodiment.

As shown in FIG. 16 a video decoding apparatus 1600 provided herein according to an embodiment comprises an obtaining unit 1610 (for example, comprising a parser) and a determining unit 1620. As shown in FIG. 17, an video encoding apparatus 1700 provided herein according to an embodiment comprises a determining unit 1710 and an encoding unit 1720.

The obtaining unit 1610 comprised in the video decoding apparatus 1600 shown in FIG. 16 is configured to obtain a value of a first syntax element (for example, sps_ptl_dpb_hrd_params_present_flag according to the description above) from the SPS, wherein the value of the first syntax element is used to specify whether a decoded picture buffer, DPB, parameters syntax structure is present in a SPS coded in the video bitstream. The determining unit 1620 comprised in the video decoding apparatus 1600 shown in FIG. 16 is configured to determine whether the value of the first syntax element specifies that the DPB parameters syntax structure is present in the SPS. Further, the obtaining unit 1610 is configured to obtain a value of a second syntax element (for example, sps_sublayer_dpb_params_flag according to the description above) from the SPS, at least when determining (it is determined) that the value of the first syntax element specifies that the DPB parameters syntax structure is present in the SPS, wherein the value of the second syntax element is used to specify the presence of a DPB syntax element (for example, one of max_dec_pic_buffering_minus1[i], max_num_reorder_pics[i], and max_latency_increase_plus1[i] according to the detailed description above) in the DPB parameters syntax structure, wherein the DPB syntax element is applied to a temporal sublayer except for the highest temporal sublayer in the video sequence.

The determining unit 1710 comprised in the video encoding apparatus 1700 shown in FIG. 17 is configured to determine the presence of a decoded picture buffer, DPB, parameters syntax structure in a SPS. The encoding unit 1720 comprised in the video encoding apparatus 1700 shown in FIG. 17 is configured to encode a value of a first syntax element (for example, sps_ptl_dpb_hrd_params_present_flag according to the description above) into the SPS based on the determining of the presence of the DPB parameters syntax structure in the SPS, wherein the value of the first syntax element is used to specify whether the DPB parameters syntax structure is present in the SPS. Further, the determining unit 1710 is configured to determine the presence of a DPB syntax element (for example, one of max_dec_pic_buffering_minus1[i],max_num_reorder_pics [i], and max_latency_increase_plus1[i] according to the detailed description above) in the DPB parameters syntax structure, when determining (it is determined, for example, only when it is determined) that the DPB parameters syntax structure is present in the SPS, wherein the DPB syntax element is applied to a temporal sublayer except for the highest temporal sublayer in the video sequence. Further, the encoding unit 1720 is configured to encode a value of a second syntax (for example, sps_sublayer_dpb_params_flag according to the description above) element into the SPS based on the determining of the presence of the DPB syntax element in the DPB parameters syntax structure, wherein the value of the second syntax element is used to specify the presence of the DPB syntax element in the DPB parameters syntax structure.

Figure 8:
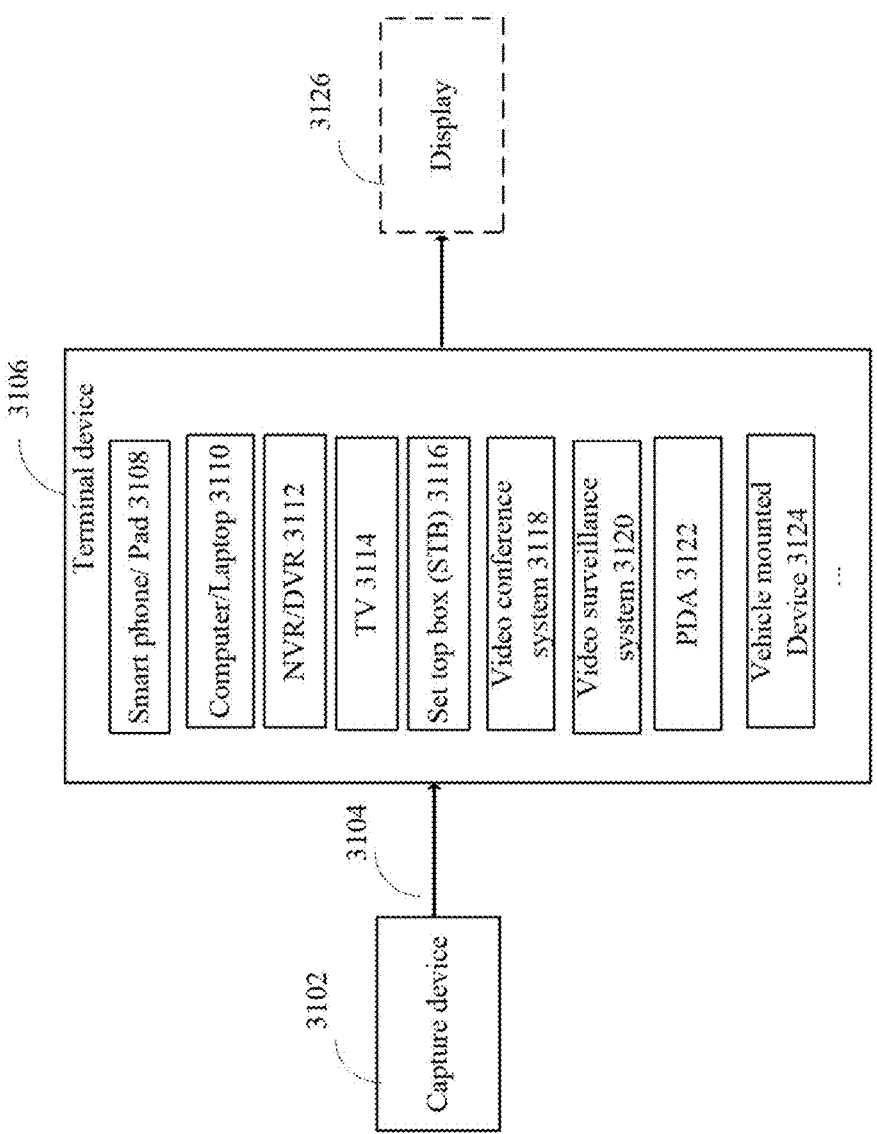
FIG. 8 is a block diagram showing an example structure of a content supply system 3100 which realizes a content delivery service.
Figure 9:
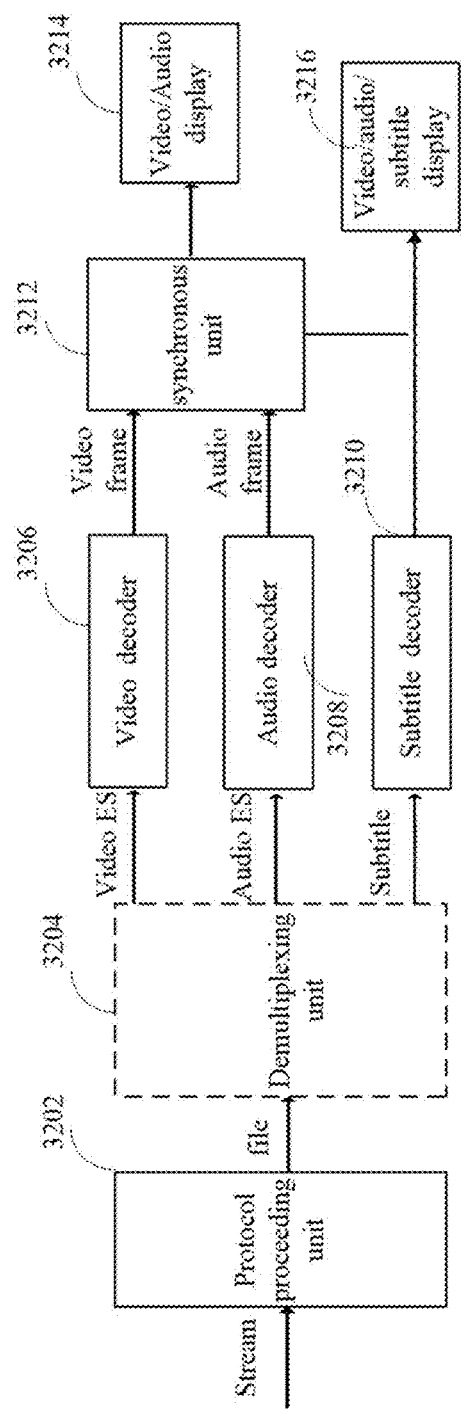
FIG. 9 is a block diagram showing a structure of an example of a terminal device.

The video decoding apparatus 1600 shown in FIG. 16 may be or may be comprised by the decoder 30 shown in FIGS. 1A, 1B, and 3 and the video decoder 3206 shown in FIG. 9. Moreover, the decoding device 1700 may be comprised by the video coding device 400 shown in FIG. 4, the apparatus 500 shown in FIG. 5 and the terminal device 3106 shown in FIG. 8. The encoding device 1700 shown in FIG. 17 may be or may be comprised by the encoder 20 shown in FIGS. 1A, 1B and 3. Further, the encoding device 1700 may be comprised by the video coding device 400 shown in FIG. 4, the apparatus 500 shown in FIG. 5 and the capture device 3102 shown in FIG. 8.

In particular, the SPS includes information on signaling of subpicture.

Some parts of the following Table shows a snapshot of part of the subpicture signaling in SPS in ITU JVET-Q200T-v13, with the download link as follows:

http://phenix.it-sudparis.eu/jvet/doc_end_user/documents/17_Brussels/wg11/JVET-Q2001-v13.zip. In the remaining part of the application this document will be named VVC draft 8 for simplicity.

| seq_parameter_set_rbsp( ) { | Descriptor |
|---|---|
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc == 3) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic info_present flag) { | |
|     sps_num_subpics_minus1 | ue(v) |
|     sps_independent_subpics_flag | u(1) |
|     for( i = 0; sps_num_subpics_minus1 > && i <= sps_num_subpics_minus 1; i++ ) | |
|     { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |

```
seq_parameter_set_rbsp( ) {                                            Descriptor
    subpic_height_minus1[ i ]                                          u(v)
    if( !sps_independent_subpics_flag) {
      subpic_treated_as_pic_flag[ i ]                                  u(1)
      loop_filter_across_subpic_enabled_flag[ i ]                      u(1)
    }
  }
...
...
```

Some syntax elements in SPS signal the position information and the control flags of each subpicture. The position information for the i-th subpicture includes:
  subpic_ctu_top_left_x[i], indicating the horizontal component of the top-left coordinate of the subpicture i in the picture; or
  subpic_ctu_top_left_y[i] indicating the vertical component of the top-left coordinate of the subpicture i in the picture; or
  subpic_width_minus1[i] indicating width of the subpicture i in the picture; or
  subpic_height_minus1[i] indicating height of the subpicture i in the picture.

Some syntax elements indicate the number of subpictures inside the picture, e.g. sps_num_subpics_minus1.

Partitioning of a Picture Into CTUs, Slices, Tiles and Subpictures

Partitioning of the Picture Into CTUs

Figure 6:
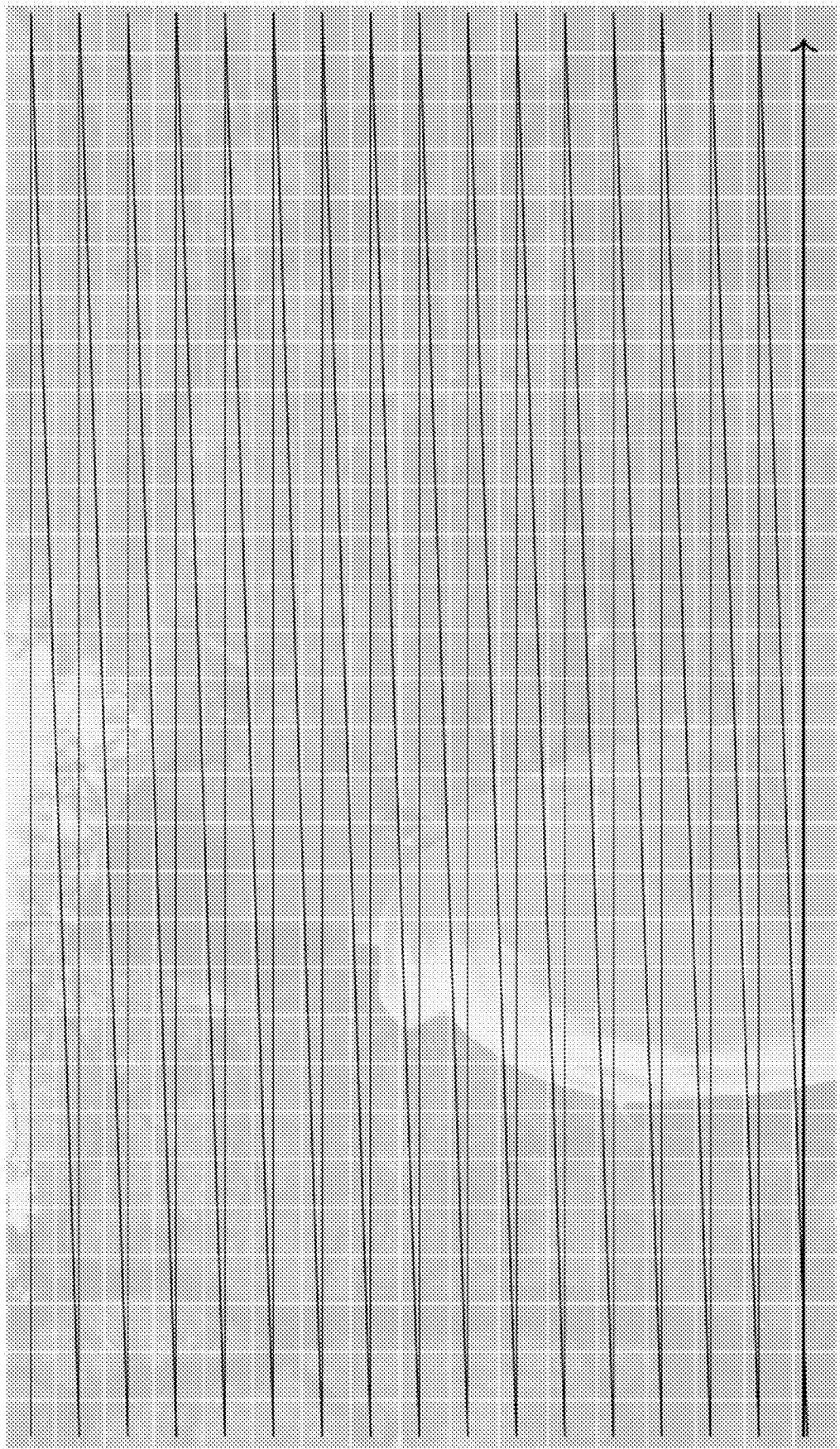
FIG. 6 is an example of raster scan order.

Picture is divided into a sequence of coding tree units (CTUs). The term CTU is sometimes used interchangeably as CTB (coding tree block). In an example, the term CTU is same as the CTU definition in the ITU-T H.265. For a picture that has three sample arrays, a CTU comprises an N×N block of luma samples, and two corresponding blocks of chroma samples. FIG. 6 shows an example of a picture divided into CTUs. The size of CTUs may require to be the same except for the CTUs located at the picture boundaries (where incomplete CTUs can be present).

Partitioning of the Picture Into Tiles

In some examples, when tiles are enabled, picture is divided into rectangular-shaped groups of CTUs separated by vertical and/or horizontal boundaries. The vertical and horizontal tile boundaries intersect the picture from to bottom and from left picture boundary to right picture boundary respectively. Indications information related to the position of the horizontal tile boundaries and vertical tile boundaries are coded in bitstream.

Figure 7:
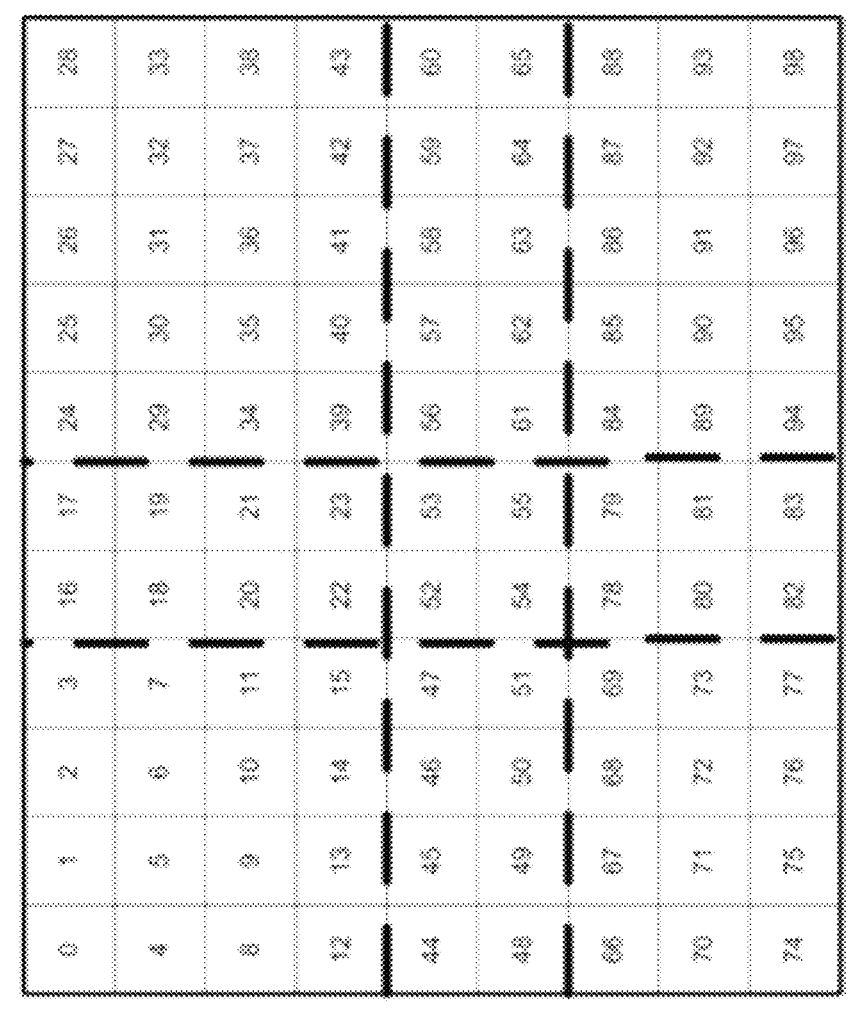

FIG. 7 exemplifies partitioning of a picture into 9 tiles. In this example, the tile boundaries are marked with bold dashed lines.

When there are more than 1 tile dividing a picture vertically, the scan order of the CTUs is changed with respect to the raster scan order of CTUs in the picture. The CTUs are scanned according to the following rule:
  1. Tiles are scanned from left to right and from top to bottom in raster scan order, which is called the tile scan order. This means that starting from the top-left tile, first all tiles in the same tile row are scanned from left to right. Then starting with the first tile in the second tile row (the tile row that is one below), all tiles in the second tile row are scanned from left to right. The process is repeated till all tiles are scanned.
  2. For a tile, CTUs in this tile are scanned in raster scan order. For each CTU row, CTUs are scanned from left to right and CTU rows are scanned from top to bottom. The FIG. 7 exemplifies the scanning order of CTUs in the tiles, the numbers correspond to the CTUs indicate the scanning order.

The tile provides a partitioning of a picture in such a way that each tile is independently decodable from other tiles of the same picture, where decoding refers to entropy, residual, and predictive decoding. Moreover with tiles it is possible to partition the picture into similar sized regions. Therefore it is possible to process the tiles of a picture in parallel to each other, which is preferable for multi-core processing environments where each processing core is identical to each other.

The terms processing order and scanning order are used as follows in the application:

Processing refers to encoding or decoding of CTUs in the encoder or decoder. Scanning order relates to the indexing of the particular partition in a picture. The CTUs are indexed in increasing order in a picture according to a specified scan order. CTU scan order in tile means how the CTUs inside a tile is indexed, which might not be the same order in which they are processed (i.e. processing order).

Partitioning of the Picture Into Slices

The slice concept provides a partitioning of a picture in such a way that each slice is independently decodable from other slices of the same picture, where decoding refers to entropy, residual, and predictive decoding. The difference to tiles is that slices can have arbitrary shapes that are not necessarily rectangular (more flexible in partitioning possibilities), and the purpose of slice partitioning is not parallel processing but packet size matching in transmission environments and error resilience.

A slice may comprise a complete picture or comprises a part of a picture. In ITU-T H.265, a slice comprises consecutive CTUs of a picture in processing order. The slice is identified according to a starting CTU address, the starting CTU address is signalled in a slice header or in a picture parameter set or in other unit. In an example the slice might be identified according to a starting tile address when the slices are required to comprise integer number of tiles.

In the draft 8 of VVC, a slice comprises an integer number of tiles or an integer number of consecutive CTU rows within a tile of a picture. Consequently, a vertical slice boundary is also a vertical tile boundary. It is possible that a horizontal boundary of a slice is not a tile boundary, horizontal CTU boundaries may be comprised within a tile; in an example, when a tile is split into multiple rectangular slices, each slice comprises an integer number of consecutive complete CTU rows within the tile.

In some examples, there are two slice modes, the raster-scan slice mode and the rectangular slice mode. In the raster-scan slice mode, a slice comprises a sequence of tiles in a tile raster scan of a picture. In the rectangular slice mode, a slice comprises a number of tiles that collectively form a rectangular region of the picture, or a slice comprises a number of consecutive CTU rows of one tile that collectively form a rectangular region of the picture. Tiles within a rectangular slice are scanned in tile raster scan order within the rectangular region corresponding to that slice.

All slices of a picture collectively form the entire picture, i.e. all CTUs of a picture are comprised in one of the slices of a picture. Similar rules apply for tiles and subpictures.

Partitioning of the Picture Into Subpictures

A subpicture may be a rectangular partition of a picture. A subpicture can be the whole picture or a part of the picture. A subpicture is partitioning of a picture in such a way that each subpicture is independently decodable from other subpictures of the entire video sequence. In VVC draft 8, when subpic_treated_as_pic_flag[i] indication is true (e.g. a value of subpic_treated_as_pic_flag[i] is 1) for subpicture i, that subpicture i is independently decodable from other subpictures of the entire video sequence.

The difference between the subpicture and tiles or slices is that, subpictures create an independently decodable video sequence. For tiles and slices, independent decoding is performed in a single picture of a video sequence.

In VVC draft 8, a subpicture comprises one or more slices that collectively cover a rectangular region of a picture. Consequently, each subpicture boundary is always a slice boundary, and each vertical subpicture boundary is always a vertical tile boundary.

Figure 10:
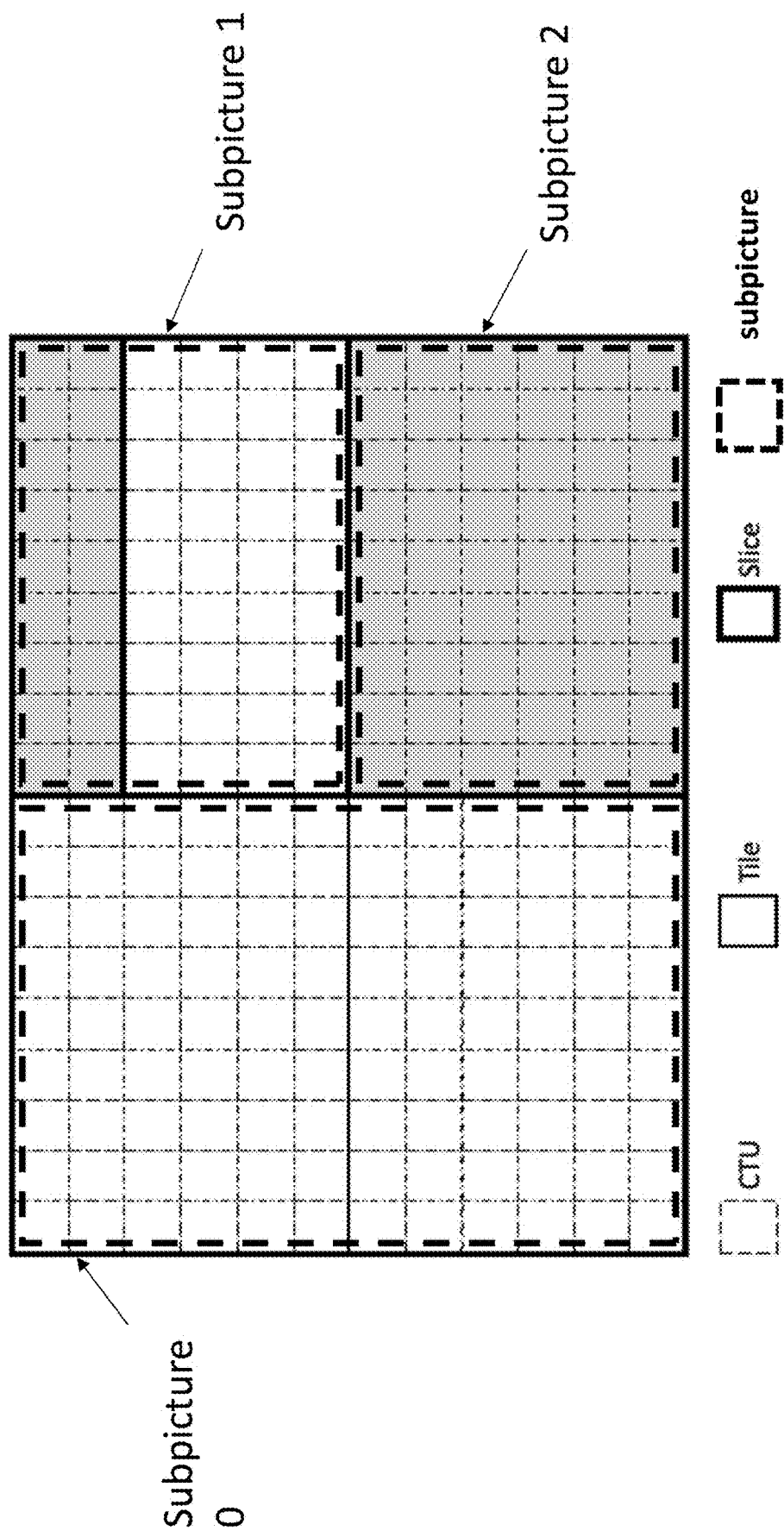
FIG. 10 shows an example of picture partitioning.

FIG. 10 provides an example of tiles, slices and subpictures.

In one example as shown in FIG. 8, a picture is partitioned into 216 CTUs, 4 tiles, 4 slices and 3 subpictures. A value of sps_num_subpics_minus1 is 2, and the position-related syntax elements have the following values:

For subpicture 0,
subpic_ctu_top_left_x[0] is not signaled but inferred as 0;
subpic_ctu_top_left_y[0] is not signaled but inferred as 0;
subpic_width_minus1[0] value is 8;
subpic_height_minus1[0] value is 11.
For subpicture 1,
subpic_ctu_top_left_x[1] value is 9;
subpic_ctu_top_left_y[1] value is 0;
subpic_width_minus1[1] value is 8;
subpic_height_minus1[1] value is 5.
For subpicture 2,
subpic_ctu_top_left_x[2] value is 9;
subpic_ctu_top_left_y[2] value is 6;
subpic_width_minus1[2] is not signaled but inferred as 8;
subpic_height_minus1[2] is not signaled but inferred as 5.

Signaling of Decoded Picture Buffer (DPB) Information.

Decoded Picture Buffer

Decoded Picture Buffer (DPB) is a buffer which is used to store the decoded picture for reference, for example, as a reference picture for inter prediction. In an example disclosed in VVC draft (e.g. ITU JVET-Q2001-v13), the related syntax elements of parameters for DBP in sequence parameter set (SPS) are highlighted.

TABLE 6

| Decoded picture related syntax elements in SPS | |
|---|---|
| sps_poc_msb_flag | u(1) |
| if( sps_poc_msb_flag ) | |
|   poc_msb_len_minus1 | ue(v) |
| num_extra_ph_bits_bytes | u(2) |
|   extra_ph_bits_struct( num_extra_ph_bits_bytes ) | |
| num_extra_sh_bits_bytes | u(2) |
|   extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| long_term_ref_pics_flag | u(1) | sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.

sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, the value of sps_sub_dpb_params_info_present_flag is inferred to be equal to 0.

sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these four syntax structures is present in the SPS. The value of sps_ptl_dpb_hrd_params_present_flag shall be equal to vps_independent_layer_flag[GeneralLayerIdx[nuh_layer_id]].

A syntax element sps_max_sublayers_minus1 indicates a number of available temporal sublayers. When a number of available temporal sublayers is larger than 1 (e.g. a value of syntax element sps_max_sublayers_minus1 is greater than 0), a value of the syntax element sps_sublayer_dpb_params_flag is signaled in a bitstream. Because the syntax element sps_sublayer_dpb_params_flag mandates whether to signal decode picture information for each available sublayer (when its value is equal to 1) or to signal just for the highest temporal sublayer (when its value is equal to 0). When a value of sps_sublayer_dpb_params_flag is not present, e.g. there is only one temporal sublayer (a value of sps_max_sublayers_minus1==0), the value of sps_max_sublayers_minus1 is inferred as 0.

In some examples, a value of syntax element sps_ptl_dpb_hrd_params_present_flag indicates whether a signaling structure dpb_parameter( ) is signaled in SPS or not. When a value of syntax element sps_ptl_dpb_hrd_params_present_flag is equal to 1, the signaled date structure dpb_parameter( ) is invoked, with the number of available temporal sublayers minus 1 (sps_max_sublayers_minus1) and the flag sps_sublayer_dpb_params_flag as the first and second parameter, respectively.

In an example, the signaling structure of dpb_parameter ( ) in VVC draft (e.g. ITU JVET-Q2001-v13) is defined as follows:

TABLE 7 definition of dpb_parameters

| dpb_parameters( maxSubLayersMinus1, subLayerInfoFlag ) { | Descriptor |
|---|---|
| for( i = ( subLayerInfoFlag ? 0 : maxSubLayersMinus1 ); | |
|     i <= maxSubLayersMinus1; i++ ) { | |
|     max_dec_pic_buffering_minus1[ i ] | ue(v) |
|     max_num_reorder_pics[ i ] | ue(v) |
|     max_latency_increase_plus1[ i ] | ue(v) |
|   } | |
| } | |

The dpb_parameters( ) syntax structure provides information of DPB size, maximum picture reorder number, and maximum latency for one or more OLSs.

(output layer set (OLS): A set of layers consisting of a specified set of layers, where one or more layers in the set of layers are specified to be output layers).

When a dpb_parameters( ) syntax structure is included in a VPS, the OLSs to which the dpb_parameters( ) syntax structure applies are specified by the VPS. When a dpb_parameters( ) syntax structure is included in an SPS, it applies to the OLS that includes only the layer that is the lowest layer among the layers that refer to the SPS, and this lowest layer is an independent layer.

max_dec_pic_buffering_minus1[i] plus 1 specifies the maximum required size of the DPB in units of picture storage buffers when Htid is equal to i. The value of max_dec_pic_buffering_minus1[i] shall be in the range of 0 to MaxDpbSize-1, inclusive, where MaxDpbSize is as specified in clause A.4.2. When i is greater than 0, max_dec_pic_buffering_minus1[i] shall be greater than or equal to max_dec_pic_buffering_minus1[i-1]. When max_dec_pic_buffering_minus1[i] is not present for i in the range of 0 to maxSubLayersMinus1-1, inclusive, due to subLayerInfoFlag being equal to 0, it is inferred to be equal to max_dec_pic_buffering_minus1[maxSubLayersMinus1].

max_num_reorder_pics[i] specifies the maximum allowed number of pictures of the OLS that can precede any picture in the OLS in decoding order and follow that picture in output order when Htid is equal to i. The value of max_num_reorder_pics[i] shall be in the range of 0 to max_dec_pic_buffering_minus1[i], inclusive. When i is greater than 0, max_num_reorder_pics[i] shall be greater than or equal to max_num_reorder_pics[i-1]. When max_num_reorder_pics[i] is not present for i in the range of 0 to maxSubLayersMinus1-1, inclusive, due to subLayerInfoFlag being equal to 0, it is inferred to be equal to max_num_reorder_pics[maxSubLayersMinus1].

max_latency_increase_plus1[i] not equal to 0 is used to compute the value of MaxLatencyPictures[i], which specifies the maximum number of pictures in the OLS that can precede any picture in the OLS in output order and follow that picture in decoding order when Htid is equal to i.

When max_latency_increase_plus1[i] is not equal to 0, the value of MaxLatencyPictures[i] is specified as follows:

$$MaxLatencyPictures[i]=max\_num\_reorder\_pics[i]+ max\_latency\_increase\_plus1[i]-1 \quad (7\text{-}111)$$

When max_latency_increase_plus1[i] is equal to 0, no corresponding limit is expressed.

The value of max_latency_increase_plus1[i] shall be in the range of 0 to $2^{32}-2$, inclusive. When max_latency_increase_plus1[i] is not present for i in the range of 0 to maxSubLayersMinus1-1, inclusive, due to subLayerInfoFlag being equal to 0, it is inferred to be equal to max_latency_increase_plus1[maxSubLayersMinus1].

The dpb_parameters signaling structure either signals one sublayer's decoded picture buffer information or each sublayer's decoded picture information, controlled by the value of subLayerInfoFlag. When a value of subLayerInfoFlag is 0, the decoded picture buffer information of the highest sublayer among the available temporal sublayers is signaled (i=maxSubLayersMinus1). When a value of subLayerInfoFlag is 1, the decoded picture buffer information of each sublayer among the available temporal sublayers is signaled (a value of i ranges from 0 to maxSubLayersMinus1, inclusive).

In some examples, the syntax element sps_sublayer_dpb_params_flag is used only as the second parameter of the dpb_parameters.

Embodiment 10

According to the tenth embodiment, a value of the syntax element sps_sublayer_dpb_params_flag is coded in a bitstream, based on a value of the syntax element sps_ptl_dpb_hrd_params_present_flag as follows:

TABLE 8

| Syntax Elements in SPS | |
|---|---|
| sps_poc_msb_flag | u(1) |
| if( sps_poc_msb_flag ) | |
|   poc_msb_len_minus1 | ue(v) |
| num_extra_ph_bits_bytes | u(2) |
|   extra_ph_bits_struct( num_extra_ph_bits_bytes ) | |
| num_extra_sh_bits_bytes | u(2) |
|   extra_sh_bits_struct( num_extra_sh_bits_bytes ) | |
| if( sps_max_sublayers_minus1 > 0 && sps_ptl_dpb_hrd_params_present_flag) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| long_term_ref_pics_flag | u(1) |

In this embodiment, when a value of sps_max_sublayers_minus1 is larger than 0 and a value of sps_ptl_dpb_hrd_params_present_flag is equal to 0, a value of syntax element sps_sublayer_dpb_params_flag is not need to be coded in a bitstream.

Embodiment 11

According to the eleventh embodiment, a value of syntax element sps_sublayer_dpb_params_flag is coded in a bitstream, based on a value of the syntax element sps_ptl_dpb_hrd_params_present_flag as follows:

TABLE 9

| Syntax Elements in PPS | |
| --- | --- |
| sps_poc_msb_flag | u(1) |
| if( sps_poc msb_flag) | flag ) |
|   poc_msb_len_minus1 | ue(v) |
| num_extra_ph_bits_bytes | u(2) |
|   extra_ph_bits_struct( num_extra_ph_bits_bytes ) | |
| num_extra_sh_bits_bytes | u(2) |
|   extra_sh_bits_struct( num_extra_sh_bits_bytes ) | |
| if(sps_ptl_dpb_hrd_params_present_flag){ | |
|   if (sps_max_sublayers_minus1 > 0) | |
|     sps_sublayer_dpb_params_flag | u(1) |
|   dpb_parameters( sps max_sublayers_minus1, sps_sublayer_dpb_params_flag ) | |
| } | |
| long_term_ref_pics_flag | u(1) |

In this embodiment, when a value of sps_max_sublayers_minus1 is larger than 0 and a value of sps_ptl_dpb_hrd_params_present_flag is equal to 0, a value of syntax element sps_sublayer_dpb_params_flag is not need to be coded in a bitstream. Furthermore, the syntax elements are restructured with a clearer design. The syntax element sps_ptl_dpb_hrd_params_present_flag is leveled up to mandate the signaling of both syntax element sps_sublayer_dpb_params_flag and the signaling structure dpb_parameters( ).

Embodiment 12

According to the twelfth embodiment, a value of the syntax element sps_sublayer_dpb_params_flag is coded in a bitstream, based on a value of the syntax element sps_ptl_dpb_hrd_params_present_flag as follows:

TABLE 10

| Syntax Elements in PPS | |
| --- | --- |
| sps_poc_msb_flag | u(1) |
| if( sps_poc_msb_flag ) | |
|   poc_msb_len_minus1 | ue(v) |
| num_extra_ph_bits_bytes | u(2) |
|   extra_ph_bits_struct( num_extra_ph_bits_bytes ) | |
| num_extra_sh_bits_bytes | u(2) |
|   extra_sh_bits_strucht( num_extra_sh_bits_bytes ) | |
| if(sps_ptl_dpb_hrd_params_present_flag){ | |
|   if (sps_max_sublayers_minus1 > 0) | |
|     sps_sublayer_dpb_params_flag | u(1) |
|   firstSubLayer = sps_sublayer_dpb_params_flag ? 0: sps_max_sublayers_minus1 | |
|   dpb_parameters( firstSubLayer, sps_max_sublayers_minus1) | |
| } | |
| long_term_ref_pics_flag | u(1) |

Correspondingly, the signaling structure of dpb_parameters is modified as follows:

| dpb_parameters( firstSubLayer, maxSubLayersMinus1 ) { | Descriptor |
|---|---|
| for( i = firstSubLayer; i <= maxSubLayersMinus1; i++ ) { | |
|     max_dec_pic_buffering_minus1[ i ] | ue(v) |
|     max_num_reorder_pics[ i ] | ue(v) |
|     max_latency_increase_plus1[ i ] | ue(v) |
|   } | |
| } | |

In this embodiment, when a value of sps_max_sublayers_minus1I is larger than 0 and a value of sps_ptl_dpb_hrd_params_present_flag is equal to 0, a value of syntax element sps_sublayer_dpb_params_flag is not need to be coded in a bitstream. Compared to embodiment 11, the signaling structure of dpb_parameter( ) is signaled from the first sublayer to the highest sublayer, indicates by the parameter firstSubLayer and maxSubLayersMinus1, respectively. The selection of first sublayer is put out of dpb_parameter( ). The semantics of sps_sublayer_dpb_params_flag is clearer in this way.

In an example, as disclosed in VVC draft (e.g. ITU JVET-Q2001-v13), there are two modes for slice, raster scan slice mode and rectangle slice mode. However, according to current definition, a slice can be either in raster scan mode or in rectangle mode.

The definition of slices is described as follows:

A slice consists of an integer number of complete tiles or an integer number of consecutive complete CTU rows within a tile of a picture. Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

Figure 12:
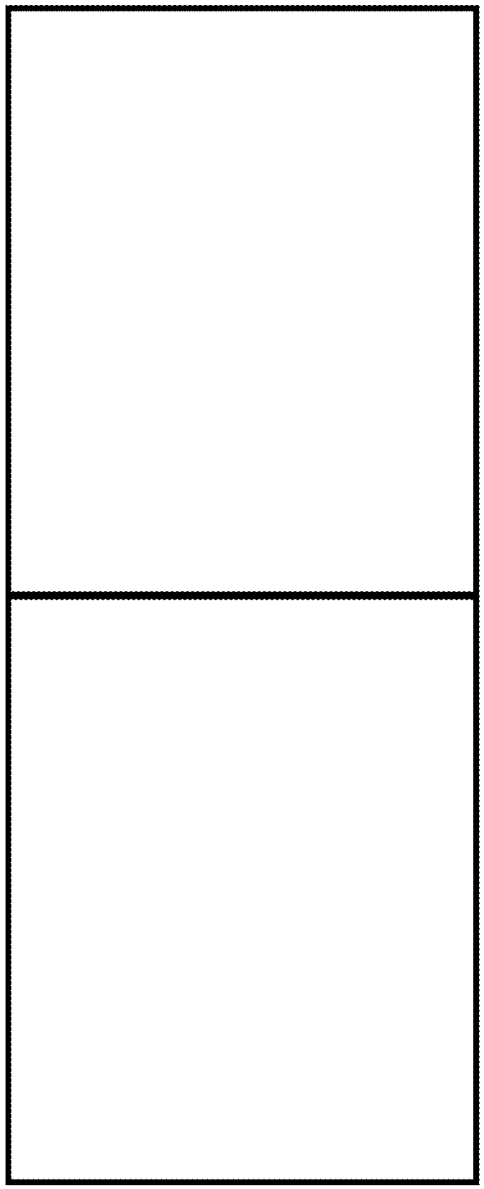
FIG. 12 shows another example of picture partitioning.

The only constraint for raster-scan slice is it "contains a sequence of complete tiles in a tile raster scan of a picture". As shown in FIG. 12, for example, there are only two tiles and one slice in a picture. This slice can be either in raster scan slice mode or rectangle slice mode. This could cause confusion for the two modes of the slice.

Embodiment 13

It is suggested to further restrict the definition of raster scan slice as follows:

In the raster-scan slice mode, a slice contains a sequence of complete tiles in a tile raster scan of a picture and this picture contains at least one slice forming a non-rectangle shape.

Figure 13:
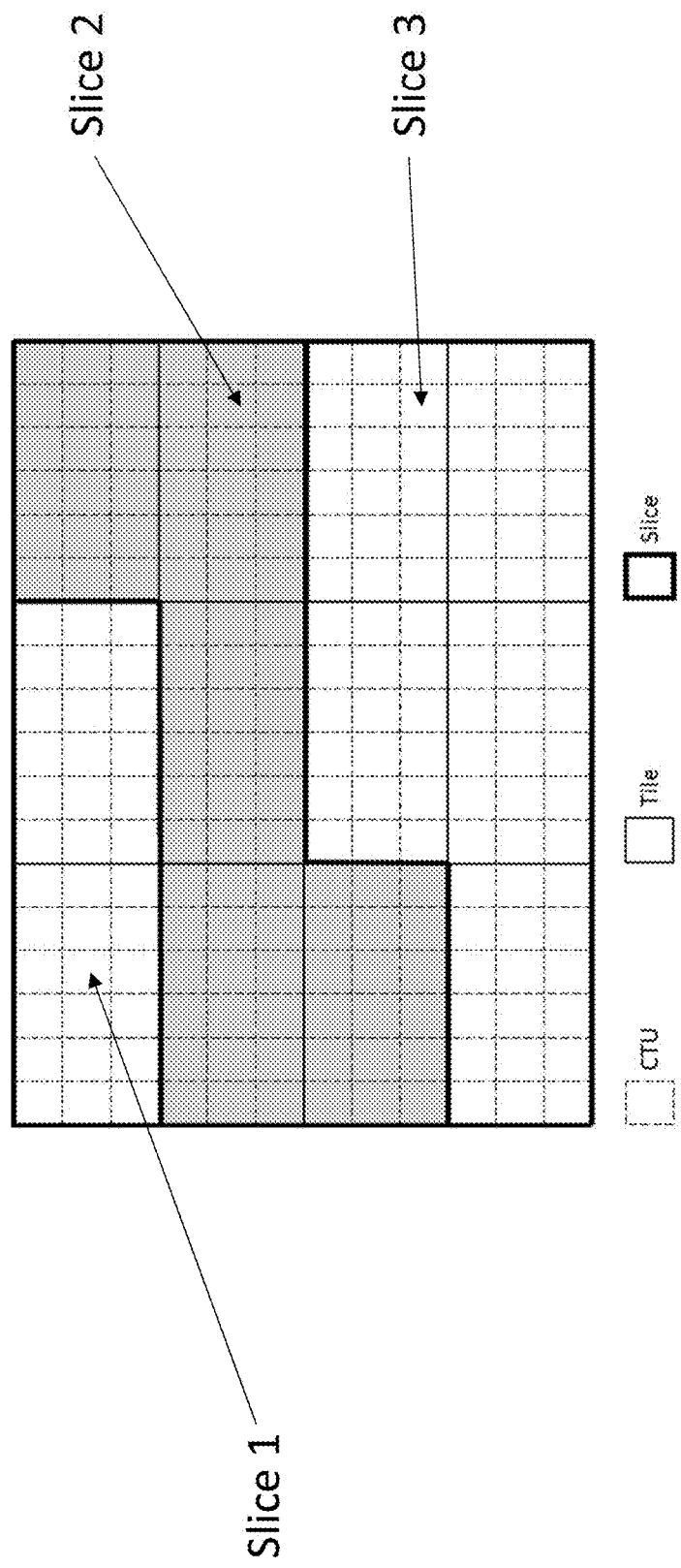
FIG. 13 shows another example of picture partitioning.

For example, with this definition of the raster scan slice, a picture as shown in FIG. 13 is a raster scan slice, but a picture as shown in FIG. 12 can only use rectangle slice mode.

Correspondingly, the signaling for tile structure is modified.

In one example, the signaling of tile information is as follows in PPS:

| | |
|---|---|
| if( !no_pic_partition_flag) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   if( NumTilesInPic > 1) | |
|     rect_slice_flag | u(1) |
|   if( rect_slice_flag ) | |
|     single_slice_per_subpic_flag | u(1) | no_pic_partition_flag equal to 1 specifies that no picture partitioning is applied to each picture referring to the PPS. no_pic_partition_flag equal to 0 specifies each picture referring to the PPS may be partitioned into more than one tile or slice.
It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 shall be equal to sps_log 2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 shall be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of CTBs for i in the range of 0 to num exp_tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] shall be in the range of 0 to PicWidthInCtbsY−1, inclusive. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile_row_height_minus1l[num_exp_tile_rows_minus1] is used to derive the height of the tile rows with index greater than or equal to num_exp_tile_rows_minus1 as specified in clause 6.5.1. The value of tile_row_height_minus1[i] shall be in the range of 0 to PicHeightInCtbsY−1, inclusive. When not present, the value of tile_row_height_minus1[0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0. [Ed. (GJS): Consider renaming this flag or clarifying in another manner to avoid an interpretation that this flag is only relevant when there are more than one subpictures in each picture.]

When a number of tile in picture is larger than 1, a flag rect_slice_flag is parsed from a bitstream, a value of rect_slice_flag indicating whether a rectangle slice mode (when the value is equal to 1) is used for a picture or a raster scan slice mode (when the value is equal to 0) is used for the picture.

Correspondingly, in slice header slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:

The slice address is the raster scan tile index.

The length of slice_address is Ceil(Log 2 (NumTilesInPic)) bits.

The value of slice_address shall be in the range of 0 to NumTilesInPic−1, inclusive.

Otherwise (rect_slice_flag is equal to 1), the following applies:

The slice address is the subpicture-level slice index of the slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

| slice_header( ) { | Descriptor |
|---|---|
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1) \|\| | |
|     ( !rect_slice_flag && NumTilesInPic > 1 ) ) | |
|     slice_address | u(v) |
|   for( i = 0; i < NumExtraPhBits; i++ ) | |
|     sh_extra_bit[ i ] | u(1) |
|   if( !rect_slice_flag && NumTilesInPic > 1 ) | |
|     num_tiles_in_slice_minus1 | ue(v) | picture_header_in_slice_header_flag equal to 1 specifies that the PH syntax structure is present in the slice header. picture_header_in_slice_header_flag equal to 0 specifies that the PH syntax structure is not present in the slice header.

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

It is a requirement of bitstream conformance that the following constraints apply:

If rect_slice_flag is equal to 0 or subpic_info_present_flag is equal to 0, the value of slice_address shall not be equal to the value of slice_address of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1, when present, specifies the number of tiles in the slice. The value of num_tiles_in_slice_minus1 shall be in the range of 0 to NumTilesInPic−1, inclusive.

It is suggested to modify the above signaling mechanism as follows in PPS and slice header:

| | |
|---|---|
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   if( NumTilesInPic > 3 ) | |
|     rect_slice_flag | u(1) |
|   if( rect_slice_flag ) | |
|     single_slice_per_subpic_flag | u(1) |

| slice header( ) { | Descriptor |
|---|---|
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 3 ) ) | |
|     slice_address | u(v) |
|   for( i = 0; i < NumExtraPhBits; i++ ) | |
|     sh_extra_bit[ i ] | u(1) |
|   if( !rect_slice_flag && NumTilesInPic > 3 ) | |
|     num_tiles_in_slice_minus1 | ue(v) |

Particularly, the following embodiments are also provided herein (in new enumeration).

Embodiment 1. A method of coding implemented by a decoding device or an encoding device, the method comprising:

obtaining a bitstream, a sequence parameter set, SPS, is coded in the bitstream;

obtaining a value of a first syntax element sps_max_sublayers_minus1 according to the bitstream, wherein the value of the first syntax element sps_max_sublayers_minus1I is used to indicate the maximum number of temporal sublayers that present in a coded layer video sequence, CLVS, referring to the SPS;

obtaining a value of a second syntax element sps_ptl_dpb_hrd_params_present_flag according to the bitstream, wherein the value of the second syntax element sps_ptl_dpb_hrd_params_present_flag is used to indicate whether a decoded picture buffer, DPB, parameters syntax structure (e.g. dpb_prameters) is present in the SPS;

parsing a value of a third syntax element sps_sublayer_dpb_params_flag from the bitstream, when the value of the first syntax element sps_max_sublayers_minus1 is greater than a first default value (e.g. the first default value is equal to 0) and when the value of the second syntax element sps_ptl_dpb_hrd_params_present_flag is equal to a second default value (e.g. the second default value is equal to 1), wherein the value of the third syntax element sps_sublayer_dpb_params_flag is used to control presence of a syntax element (e.g. max_dec_pic_buffering_minus1[i], max_num_reorder_pics[i], and/or max_latency_increase_plus1[i] for i in range from 0 to sps_max_sublayers_minus1−1, inclusive, when sps_max_sublayers_minus1 is larger than 0) in the DPB parameters syntax structure (e.g. dpb_prameters) in the SPS.

Embodiment 2. The method of embodiment 1, wherein the method further comprises:

setting the value of the third syntax element sps_sublayer_dpb_params_flag to a third default value (e.g. the third default value is equal to 0 or 1), when the value of the first syntax element sps_max_sublayers_minus1 is smaller than or equal to the first default value or when the value of the second syntax element sps_ptl_dpb_hrd_params_present_flag is not equal to the second default value.

Embodiment 3. The method of embodiment 1 or 2, wherein the value of the third syntax element sps_sublayer_dpb_params_flag is coded in the SPS.

Embodiment 4. A method of coding implemented by a decoding device or an encoding device, the method comprising:

obtaining a bitstream, a sequence parameter set, SPS, is coded in the bitstream;

obtaining a value of a first syntax element sps_max_sublayers_minus1 according to the bitstream, wherein the value of the first syntax element sps_max_sublayers_minus1 is used to specifies the maximum number of temporal sublayers that present in a coded layer video sequence, CLVS, referring to the SPS;

obtaining a value of a second syntax element sps_ptl_dpb_hrd_params_present_flag according to the bitstream, wherein the value of the second syntax element sps_ptl_dpb_hrd_params_present_flag is used to specify whether a decoded picture buffer, DPB, parameters syntax structure (e.g. dpb_prameters) is present in the SPS;

determining whether the value of the second syntax element sps_ptl_dpb_hrd_params_present_flag is equal to a second default value (e.g. the second default value is equal to 1);

determining whether the value of the first syntax element sps_max_sublayers_minus1 is greater than a first default value (e.g. the first default value is equal to 0), when it's determined that the value of the second syntax element sps_ptl_dpb_hrd_params_present_flag is equal to the second default value;

parsing a value of a third syntax element sps_sublayer_dpb_params_flag from the bitstream, when it's determined that the value of the first syntax element sps_max_sublayers_minus1 is greater than the first default value (e.g. the first default value is equal to 0), wherein the value of the third syntax element sps_sublayer_dpb_params_flag is used to control presence of a syntax element (e.g. max_dec_pic_buffering_minus1[i], max_num_reorder_pics[i], and/or max_latency_increase_plus1[i] for i in range from 0 to sps_max_sublayers_minus1−1, inclusive, when sps_max_sublayers_minus1 is larger than 0) in the DPB parameters syntax structure (e.g. dpb_prameters) in the SPS.

Embodiment 5. The method of embodiment 4, wherein the method further comprises:

setting the value of the third syntax element sps_sublayer_dpb_params_flag to a third default value (e.g. the third default value is equal to 0 or 1), when it's determined that the value of the first syntax element sps_max_sublayers_minus1 is smaller than or equal to the first default value or when it's determined that the value of the second syntax element sps_ptl_dpb_hrd_params_present_flag is not equal to the second default value.

Embodiment 6. The method of embodiment 4 or 5, wherein the value of the third syntax element sps_sublayer_dpb_params_flag is coded in the SPS (in other examples, the value of the third syntax element sps_sublayer_dpb_params_flag is coded in a picture parameter set, PPS or the value of the third syntax element sps_sublayer_dpb_params_flag is coded in a video parameter set, VPS).

Embodiment 7. The method of any one of embodiments 1 to 6, wherein the value of the first syntax element is coded in a picture parameter set, PPS or the value of the first syntax element is coded in a video parameter set, VPS (in another example, the value of the second syntax element is coded in a picture parameter set, PPS or the value of the second syntax element is coded in a video parameter set, VPS).

Embodiment 8. The method of any one of embodiments 1 to 7, wherein when sps_max_sublayers_minus1 is equal to 0, max_dec_pic_buffering_minus1[0], max_num_reorder_pics[0], and max_latency_increase_plus1[0] is always signaled for the only sublayer referred to the SPS.

Embodiment 9. A method of coding implemented by a decoding device or an encoding device, the method comprising:

determining an indirect reference layer with index j of a layer with index i, only from at least one layer with index lower than i;

when inter-layer prediction is enabled for current picture, obtain its reference picture in the indirect reference layer with index j, predicting a current picture using the reference picture from the indirect reference layer with index j.

Embodiment 10. The method of embodiment 9, wherein the determining the indirect reference layer of the layer with index i comprises: determining that there is a layer with index k, only among at least one layer with index lower than i and higher than j, is the direct reference of the layer with index i, wherein the indirect reference layer with index j is a reference layer of the direct reference layer with index k.

Embodiment 11. The method of embodiment 9, wherein the determining the indirect direct reference layer of the layer with index i comprises: determining that there is a layer with index k, only among at least one layer with index lower than i, is the direct reference of the layer with index i, wherein the indirect reference layer with index j is a reference layer of the direct reference layer with index k.

Embodiment 12. A method of coding implemented by a decoding device or an encoding device, the method comprising:

determining an indirect reference layer with index j of a layer with index i, when it is determined that there is a layer with index k, only among at least one layer with index lower than i and higher than j, is the direct reference layer of the layer with index i, and wherein the layer with index j is a reference layer of the direct reference layer with index k.

when inter-layer prediction is enabled for current picture, obtain its reference picture in the indirect reference layer with index j, predicting a current picture using the reference picture from the indirect reference layer with index j.

Embodiment 13. A method of coding implemented by a decoding device or an encoding device, the method comprising:

obtaining a bitstream, a picture parameter set, PPS, is coded in the bitstream;

obtaining a number of tile columns NumTileColumns for a current picture (e.g. the current picture contains at least one slice forming a non-rectangle shape) according to the bitstream;

obtaining a number of tile rows NumTileRows for the current picture according to the bistream;

obtaining a value of variable NumTilesInPic according to the number of tile columns NumTileColumns and the number of tile rows NumTileRows;

parsing a value of a syntax element rect_slice_flag from the bitstream, when the value of variable NumTilesInPic is greater than a preset value (e.g. the preset value is 3), wherein the value of the syntax element rect_slice_flag is used to specify whether slice information is signaled in the PPS.

Embodiment 14. The method of embodiment 13, wherein the method further comprise:

setting the value of the syntax element rect_slice_flag to a fourth default value (e.g. the fourth default value is equal toT), when the value of variable NumTilesInPic is smaller than or equal to the preset value.

Embodiment 15. The method of embodiment 13 or 14, wherein the value of variable NumTilesInPic is equal to NumTileColumns*NumTileRows.

Embodiment 16. The method of any one of embodiments 13 to 15, wherein the method further comprises:

parsing a value of a slice address slice_address of a current slice from the bitstream, when value of the syntax element rect_slice_flag is equal to a fifth default value (e.g. the fifth default value is equal to 0) and when the value of variable NumTilesInPic is greater than the preset value, wherein the current slice is comprised in the current picture.

Embodiment 17. The method of embodiment 16, wherein the value of the slice address is coded in a slice header for the current slice.

Embodiment 18. The method of any one of embodiments 13 to 17, wherein the method further comprises:

obtaining a number of tiles num_tiles_in_slice_minus1 comprised in the current slice, when the value of the syntax element rect_slice_flag is equal to the fifth default value and when the value of variable NumTilesInPic is greater than the preset value.

Embodiment 19. The method of embodiment 18, wherein the number of tile num_tiles_in slice minus1 is coded in a slice header for the current slice.

Embodiment 20. A decoder comprising processing circuitry for carrying out the method according to any one of embodiments 1 to 19.

21. A computer program product comprising program code for performing the method according to any one of the embodiments 1 to 19 when executed on a computer or a processor.

22. A decoder, comprising:
one or more processors; and
a non-transitory computer-readable storage medium coupled to the processors and storing programming for execution by the processors, wherein the programming, when executed by the processors, configures the decoder to carry out the method according to any one of the embodiments 1 to 19.

23. A non-transitory computer-readable medium carrying a program code which, when executed by a computer device, causes the computer device to perform the method of any one of the embodiments 1 to 19.

Following is an explanation of the applications of the encoding method as well as the decoding method as shown in the above-mentioned embodiments, and a system using them.

FIG. 8 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

FIG. 9 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 9) before feeding it to the synchronous unit 3212. Similarly, the audio frame may store in a buffer (not shown in FIG. 9) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present embodiment of the disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:

x && y Boolean logical "and" of x and y
x||y Boolean logical "or" of x and y
! Boolean logical "not"
x ? y: z If x is TRUE or not equal to 0, evaluates to the value of y; otherwise, evaluates to the value of z.

Relational Operators

The following relational operators are defined as follows:

\> Greater than
\>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right); & x > 0 \\ Atan\left(\frac{y}{x}\right) + \pi; & x < 0 \text{ \&\& } y >= 0 \\ Atan\left(\frac{y}{x}\right) - \pi; & x < 0 \text{ \&\& } y < 0 \\ +\frac{\pi}{2}; & x == 0 \text{ \&\& } y >= 0 \\ -\frac{\pi}{2}; & \text{otherwise} \end{cases}$$

Ceil(x) the smallest integer greater than or equal to x.
$Clip1_Y(x) = Clip3(0, (1<<BitDepth_Y)-1, x)$
$Clip1_C(x) = Clip3(0, (1<<BitDepth_C)-1, x)$ $$Clip3(x, y, z) = \begin{cases} x; & z < x \\ y; & z > y \\ z; & \text{otherwise} \end{cases}$$

Cos(x) the trigonometric cosine function operating on an argument x in units of radians.
Floor(x) the largest integer less than or equal to x.

$$GetCurrMsb(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).
Log 2(x) the base-2 logarithm of x.
Log 10(x) the base-10 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

$Round(x) = Sign(x) * Floor(Abs(x) + 0.5)$ $$Sign(x) = \begin{cases} 1; & x > 0 \\ 0; & x == 0 \\ -1; & x < 0 \end{cases}$$

Sin(x) the trigonometric sine function operating on an argument x in units of radians
$Sqrt(x) = \sqrt{x}$
Swap(x,y)=(y, x)
Tan(x) the trigonometric tangent function operating on an argument x in units of radians Order of Operation Precedence When an order of precedence in an expression is not indicated explicitly by use of parentheses, the following rules apply:
  Operations of a higher precedence are evaluated before any operation of a lower precedence.
  Operations of the same precedence are evaluated sequentially from left to right.
The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table) operations (with operands x, y, and z)

"x++", "x– –"
"!x", "–x" (as a unary prefix operator)
$x^y$

"x * y", "x / y", "x ÷ y", "$\frac{x}{y}$", "x % y"

"x + y", "x – y" (as a two-arguement operator), "$\sum_{i=x}^{y} f(i)$"

"x << y", "x >> y"
"x < y", "x <= y", "x > y", "x >= y"
"x == y", "x != y"
"x & y"
"x | y"
"x && y"
"x || y"
"x ? y : z"
"x . . . y"
"x = y", "x += y", "x –= y"

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:
  . . . as follows/ . . . the following applies:
    If condition 0, statement 0
    Otherwise, if condition 1, statement 1
    . . .
    Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . "statements can be identified by matching " . . . as follows" or " . . . the following applies" with the ending "Otherwise . . . ".

In the text, a statement of logical operations as would be described mathematically in the following form:

```
if( condition 0a  &&  condition 0b )
    statement 0
else if( condition 1a  ||  condition 1b )
    statement 1
...
else
    statement n
``` may be described in the following manner:
... as follows/ ... the following applies:
   If all of the following conditions are true, statement 0:
      condition 0a
      condition 0b
   Otherwise, if one or more of the following conditions are true, statement 1:
      condition 1a
      condition 1b
   ...
   Otherwise, statement n In the text, a statement of logical operations as would be described mathematically in the following form:
   if(condition 0)
      statement 0
   if(condition 1)
      statement 1
may be described in the following manner:
   When condition 0, statement 0
   When condition 1, statement 1.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of decoding a video bitstream implemented by a decoding device, the method comprising:
   obtaining a value of a first syntax element from a sequence parameter set (SPS), wherein the value of the first syntax element is used to specify whether a decoded picture buffer (DPB) parameters syntax structure is present in the SPS, wherein the SPS is coded in the video bitstream and contains syntax elements that apply to a video sequence; and
   obtaining a value of a second syntax element from the SPS, at least when determining that the value of the first syntax element specifies that the DPB parameters syntax structure is present in the SPS, wherein the value of the second syntax element is used to specify presence of a DPB syntax element in the DPB parameters syntax structure, wherein the DPB syntax element is applied to a temporal sublayer except for a highest temporal sublayer in the video sequence.

2. The method of claim 1, further comprising:
   obtaining a value of the DPB syntax element based on the value of the second syntax element; and reconstructing the video sequence based on the value of the DPB syntax element.

3. The method of claim 2, wherein the obtaining the value of the DPB syntax element based on the value of the second syntax element comprises:
obtaining the value of the DPB syntax element from the DPB parameters syntax structure, when determining that the value of the second syntax element specifies that the DPB syntax element is present in the DPB parameters syntax structure; or
setting the value of the DPB syntax element equal to a value of another DPB syntax element applied to the highest temporal sublayer in the DPB parameters syntax structure, when determining that the value of the second syntax element specifies that the DPB syntax element is not present in the DPB parameters syntax structure.

4. The method of claim 2, wherein the reconstructing the video sequence based on the value of the DPB syntax element comprises: configuring the DPB based on the value of the DPB syntax element; and reconstructing the video sequence using the DPB.

5. The method of claim 2, wherein the reconstructing the video sequence based on the value of the DPB syntax element comprises: reconstructing the video sequence based on determining that the DPB used satisfies a requirement specified by the value of the DPB syntax element.

6. The method of claim 1, further comprising:
obtaining a value of a third syntax element from the SPS, wherein the value of the third syntax element is used to determine a maximum number of temporal sublayers that are present in the video sequence.

7. The method of claim 6, wherein the obtaining the value of the second syntax element from the SPS comprises:
determining whether the maximum number of the temporal sublayers in the video bitstream is greater than 1 based on the value of the third syntax element, when determining that the value of the first syntax element specifies that the DPB parameters syntax structure is present in the SPS; and
obtaining the value of the second syntax element from the SPS, when determining that the maximum number of the temporal sublayers is greater than one.

8. A method of encoding a video bitstream implemented by an encoding device, the method comprising:
determining presence of a decoded picture buffer (DPB) parameters syntax structure in a sequence parameter set (SPS), wherein the SPS is encoded in the video bitstream and contains syntax elements that apply to a video sequence;
encoding a value of a first syntax element into the SPS based on the determining of the presence of the DPB parameters syntax structure in the SPS, wherein the value of the first syntax element is used to specify whether the DPB parameters syntax structure is present in the SPS;
determining presence of a DPB syntax element in the DPB parameters syntax structure, when determining that the DPB parameters syntax structure is present in the SPS, wherein the DPB syntax element is applied to a temporal sublayer except for a highest temporal sublayer in the video sequence; and
encoding a value of a second syntax element into the SPS based on the determining of the presence of the DPB syntax element in the DPB parameters syntax structure, wherein the value of the second syntax element is used to specify the presence of the DPB syntax element in the DPB parameters syntax structure.

9. The method of claim 8, further comprising: determining a value of the DPB syntax element when determining that the DPB syntax element is present in the DPB parameters syntax structure; and reconstructing the video sequence based on the value of the DPB syntax element.

10. The method of claim 8, further comprising: setting the value of the DPB syntax element equal to a value of another DPB syntax element applied to the highest temporal sublayer in the DPB parameters syntax structure; and reconstructing the video sequence based on the value of the DPB syntax element.

11. The method of claim 9, wherein the reconstructing the video sequence based on the value of the DPB syntax element comprises: configuring the DPB to satisfy the value of the DPB syntax element; and reconstructing the video sequence using the DPB.

12. The method of claim 8, wherein the presence of a DPB syntax element in the DPB parameters syntax structure is determined, when it is determined that the DPB parameters syntax structure is present in the SPS and a maximum number of temporal sublayers in the video bitstream is greater than one.

13. An apparatus for decoding a coded video bitstream, wherein the apparatus comprises:
an obtaining unit configured to obtain a value of a first syntax element from a sequence parameter set (SPS) coded in the video bitstream, wherein the value of the first syntax element is used to specify whether a decoded picture buffer (DPB) parameters syntax structure is present in the SPS; and
a determining unit configured to determine whether the value of the first syntax element specifies that the DPB parameters syntax structure is present in the SPS; and wherein
the obtaining unit is further configured to obtain a value of a second syntax element from the SPS, at least when determining that the value of the first syntax element specifies that the DPB parameters syntax structure is present in the SPS, wherein the value of the second syntax element is used to specify presence of a DPB syntax element in the DPB parameters syntax structure, wherein the DPB syntax element is applied to a temporal sublayer except for a highest temporal sublayer in a video sequence.

14. An apparatus for encoding a video bitstream, wherein the apparatus comprises:
a determining unit configured to determine presence of a decoded picture buffer (DPB) parameters syntax structure in a sequence parameter set (SPS) encoded in the video bitstream; and
an encoding unit configured to encode a value of a first syntax element into the SPS based on the determining of the presence of the DPB parameters syntax structure in the SPS, wherein the value of the first syntax element is used to specify whether the DPB parameters syntax structure is present in the SPS; wherein
the determining unit is further configured to determine presence of a DPB syntax element in the DPB parameters syntax structure, when determining that the DPB parameters syntax structure is present in the SPS, wherein the DPB syntax element is applied to a temporal sublayer except for a highest temporal sublayer in a video sequence; and wherein
the encoding unit is further configured to encode a value of a second syntax element into the SPS based on the determining of the presence of the DPB syntax element in the DPB parameters syntax structure, wherein the value of the second syntax element is used to specify the presence of the DPB syntax element in the DPB parameters syntax structure.

15. A computer program product embodied on a non-transitory computer-readable medium, the computer program product comprising a program code for performing the method according to claim 1 when executed on a computer or a processor.

16. A decoder, comprising:
one or more processors; and
a non-transitory computer-readable storage medium coupled to the processors and storing programming for execution by the processors, wherein the programming, when executed by the processors, configures the decoder to carry out the method according to claim 1.

17. An encoder, comprising:
one or more processors; and
a non-transitory computer-readable storage medium coupled to the processors and storing programming for execution by the processors, wherein the programming, when executed by the processors, configures the encoder to carry out the method according to claim 8.

18. A non-transitory computer-readable medium carrying a program code which, when executed by a computer device, causes the computer device to perform the method of claim 1.

19. A non-transitory storage medium which includes an encoded bitstream, the bitstream being generated by dividing a current picture of a video signal or an image signal into a plurality blocks, and comprising a plurality of syntax elements, wherein the plurality of syntax elements comprises a first syntax element in a sequence parameter set (SPS), wherein the value of the first syntax element is used to specify whether a decoded picture buffer (DPB) parameters syntax structure is present in the SPS; in case that the value of the first syntax element specifies that the DPB parameters syntax structure is present in the SPS, the bitstream further comprises a second syntax element in the SPS, wherein the value of the second syntax element is used to specify presence of a DPB syntax element in the DPB parameters syntax structure, wherein the DPB syntax element is applied to a temporal sublayer except for a highest temporal sublayer in a video sequence.

* * * * *